United States Patent
McDonald

(10) Patent No.: US 11,677,547 B1
(45) Date of Patent: Jun. 13, 2023

(54) MOBILE AUTHENTICATOR FOR PERFORMING A ROLE IN USER AUTHENTICATION

(71) Applicant: HYPR Corp., New York, NY (US)

(72) Inventor: Michael McDonald, New York, NY (US)

(73) Assignee: HYPR Corp., New York, NY (US)

(*) Notice: Subject to any disclaimer, the term of this patent is extended or adjusted under 35 U.S.C. 154(b) by 0 days.

(21) Appl. No.: 17/871,770

(22) Filed: Jul. 22, 2022

(51) Int. Cl.
*H04L 9/08* (2006.01)
*H04W 12/0433* (2021.01)
*H04W 12/08* (2021.01)

(52) U.S. Cl.
CPC ....... *H04L 9/0825* (2013.01); *H04W 12/0433* (2021.01); *H04W 12/08* (2013.01)

(58) Field of Classification Search
CPC .. H04L 9/0825; H04W 12/0433; H04W 12/08
USPC ........................................... 713/171
See application file for complete search history.

(56) References Cited

U.S. PATENT DOCUMENTS

| | | | | |
|---|---|---|---|---|
| 8,477,941 B1* | 7/2013 | Dhanoa | ............... | H04W 12/033 455/411 |
| 9,648,015 B1 | 5/2017 | Avetisov et al. | | |
| 9,906,525 B1 | 2/2018 | Avetisov et al. | | |
| 11,354,665 B1 | 6/2022 | Avetisov et al. | | |
| 2015/0281409 A1* | 10/2015 | Tatiya | ...................... | H04Q 9/00 709/217 |
| 2020/0067907 A1* | 2/2020 | Avetisov | ............... | H04L 9/3239 |
| 2020/0067922 A1 | 2/2020 | Avetisov et al. | | |
| 2020/0162455 A1* | 5/2020 | Lin | ....................... | H04W 12/47 |
| 2020/0280855 A1 | 9/2020 | Avetisov et al. | | |
| 2020/0287901 A1 | 9/2020 | Avetisov et al. | | |
| 2020/0351660 A1 | 11/2020 | Avetisov et al. | | |
| 2021/0044976 A1 | 2/2021 | Avetisov et al. | | |
| 2021/0185531 A1 | 6/2021 | Avetisov et al. | | |
| 2021/0194703 A1* | 6/2021 | Queralt | ................... | H04L 9/006 |
| 2021/0258308 A1 | 8/2021 | Avetisov et al. | | |
| 2021/0306335 A1 | 9/2021 | Avetisov et al. | | |
| 2021/0377254 A1 | 12/2021 | Avetisov et al. | | |
| 2022/0109674 A1 | 4/2022 | Avetisov et al. | | |

(Continued)

OTHER PUBLICATIONS

"What Is FIDO2 and How Does It Work? Passwordless Authentication Advantages & Disadvantages," Hideez.com Blog, https://hideez.com/blogs/news/fido2-explained, Jan. 31, 2021, pp. 1 to 12.

(Continued)

*Primary Examiner* — Fatoumata Traore
*Assistant Examiner* — Moeen Khan
(74) *Attorney, Agent, or Firm* — Pillsbury Winthrop Shaw Pittman, LLP

(57) ABSTRACT

Provided is a process for authentication of a user on a mobile device. The user of the mobile device may authenticate with the mobile device, and credentials may be conveyed to a server via a relying device. The mobile device may directly communicate credentials to the relying device. In some examples, the user of the mobile device may authenticate using the mobile device without inputting credentials on the relying device. Credentials conveyed to the server by the relying device and authenticated by the server may permit user access to the relying device or access to an online resource from the relying device.

25 Claims, 5 Drawing Sheets

(56) References Cited

U.S. PATENT DOCUMENTS

2022/0255931 A1    8/2022    Avetisov et al.
2022/0308809 A1*  9/2022    Ishimura .............. G06F 3/1236

OTHER PUBLICATIONS

"Apple, Google, and Microsoft commit to expanded support for FIDO standard to accelerate availability of passwordless sign-ins," Apple.com Press Release, https://www.apple.com/newsroom/2022/05/apple-google-and-microsoft-commit-to-expanded-support-for-fido-standard/, May 5, 2022, pp. 1 to 5.

Fido Alliance, "Client to Authenticator Protocol (CTAP)," Implementation Draft, https://fidoalliance.org/specs/fido-v2.0-id-20180227/fido-client-to-authenticator-protocol-v2.0-id-20180227.html, Feb. 27, 2018, pp. 1 to 97.

* cited by examiner

MOBILE AUTHENTICATOR FOR PERFORMING A ROLE IN USER AUTHENTICATION

RELATED APPLICATIONS

The present application is related to U.S. application Ser. No. 17/501,925, filed on 14 Oct. 2021 and U.S. application Ser. No. 17/234,737, filed on 19 Apr. 2021. The entire contents of each aforementioned filing is incorporated herein by reference in its entirety.

BACKGROUND

1. Field

The present disclosure relates generally to cybersecurity and, more specifically, to identity management techniques leveraging mobile devices of users.

2. Description of the Related Art

Many computer systems and resources thereon are protected with identity management systems. These systems are designed to ensure that access to computer systems and resources is granted only to the appropriate entities and denied to others. Examples include computer program code in a client/server architecture that verifies that a user submitted password corresponds to an identifier supplied by the user before granting access to resources associated with that user identifier. Other approaches apply federated identity management, such as arrangements between multiple enterprises or another third-party to allow users to use identification data from one platform to obtain access on another platform. For example, an existing user of platform A may use identification data from platform A to obtain access to platform B, and platform A performs the verification. Techniques like those in OAuth 2.0, and related approaches by which a delegated third-party may verify identity on behalf of a constellation of other entities for a given user, may allow the given user to sign into an online forum or native application by logging in via their email provider. In turn, the email provider supplies an authentication token to the server hosting the online forum or exposing an application program interface (API) of the native application for authenticating user access without that server having access to the user's identification data (e.g., the identification data verified by the email provider).

Some approaches include authentication of a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to confirm the access attempt from the user. In this manner, such systems may supply additional factors by which additional confidence may be obtained regarding a user's identity, as merely compromising a user's username and password would not by itself afford access to secured resources.

Some approaches rely on user assertion of identity based on associations between accounts of the user and a public key of a key pair, for which a single-purpose physical hardware authenticator of the user maintains a private key of the key pair. Hardware authenticators have become more prevalent in the past few years and generally take one of the form of a Universal Serial Bus "USB" hardware-based security key (e.g., Yubikey or Feitian). These devices have increased in prevalence because they securely maintain private keys (or other asymmetric cryptographic key values). However, a user must carry the hardware authenticator with them and a device on which the user is being authenticated must include a USB port to receive the hardware authenticator.

SUMMARY

The following is a non-exhaustive listing of some aspects of the present techniques. These and other aspects are described in the following disclosure.

Some aspects include a process to authenticate a user of a relying device based on authentication information relayed from a mobile device of the user, the process comprising establishing, for a mobile device executing a user authentication component, a record of an identity of a user, the record indicative of the mobile device and credentials by which the user authenticates on the mobile device; receiving, from a relying device executing a client authentication component, a request to access a secure asset and a selection to authenticate via the mobile device executing the user authentication component; requesting, from the relying device, user authentication data generated by the mobile device on an authentication protocol; receiving, over a network connection from the relying device, the user authentication data in the authentication protocol, the user authentication data being translated to the authentication protocol by the relying device from a direct wireless connection to the mobile device; verifying the authentication data based on the record to determine whether the user is authenticated to access the secure asset from the relying device; and permitting, based on the verifying, the relying device to access the secure asset under the identity of the user.

Some aspects include a process performed by a relying computing device to authenticate a user, the process comprising requesting, by a computing device, access to a secure asset from a remote server; receiving, by the computing device from the remote server, a request to authenticate a user on an authentication protocol; detecting, by the computing device, a mobile device advertising an authentication service within range of a wireless communication interface of the computing device; configuring, by the computing device, a virtual device on a universal serial bus of the computing device to translate packets received on the wireless communication interface to packets output on universal serial bus in the authentication protocol and packets received on the universal serial bus in the authentication protocol to packets output on the wireless communication interface; outputting, by the computing device, one or more packets on the wireless communication interface comprising data corresponding to the request to authenticate the user on the authentication protocol; receiving, by the computing device from the mobile device, one or more packets on the wireless communication interface comprising data corresponding to a response to the request to authenticate the user on the authentication protocol; translating, by the computing device using the virtual device, the one or more received packets to one or more packets output on the universal serial bus in the authentication protocol to obtain authentication data responsive to the request to authenticate the user; and transmitting, by the computing device to the remote server, the authentication data.

Some aspects include a tangible, non-transitory, machine-readable medium storing instructions that when executed by a data processing apparatus cause the data processing apparatus to perform operations of one or more of the above-mentioned processes and computer-implemented methods.

Some aspects include a system, including: one or more processors; and memory storing instructions that when executed by the processors cause the processors to effectuate operations of one or more of the above-mentioned processes and computer-implemented methods.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
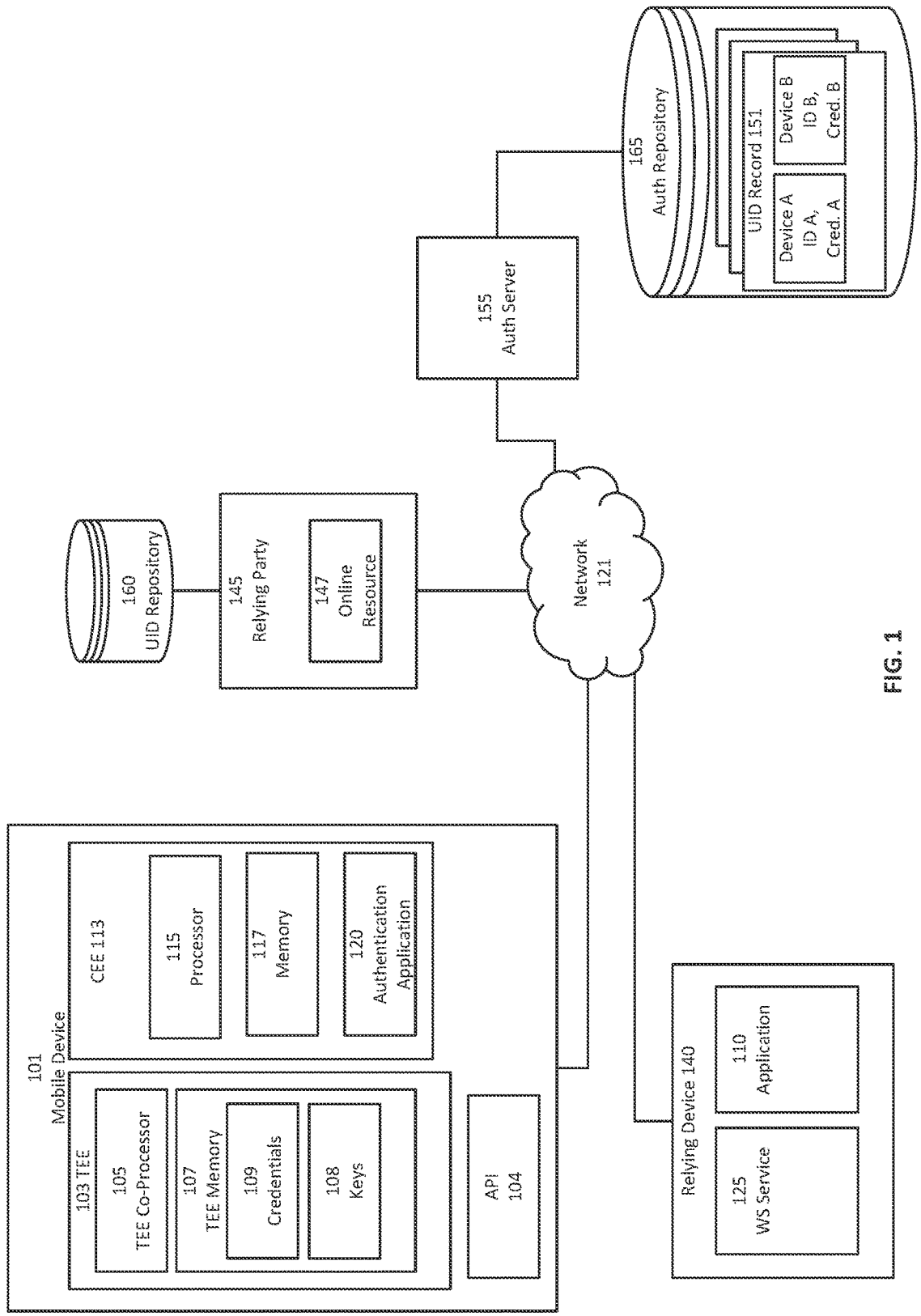
FIG. 1 is a block diagram showing an example of a computing environment by which the present techniques for user authentication may be implemented.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Existing identity management techniques can impose more friction on users and require more trust of developers than is desirable. Often, in a single computing session, a user is asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Further, enterprises hosting identity management systems may be un-trusted by other enterprises wishing to authenticate users on their systems. In some cases, the enterprises hosting identity management systems may be competitors of the other enterprises wishing to authenticate users with those types of systems, or developers may be concerned that even if an enterprise is currently trusted, subsequent management may be less reliable. In addition, an enterprise using such systems for authentication services may be unable to receive authentication tokens for authenticating user access in the event of an identity management system outage of the hosting enterprise. As a result, user experience associated with an enterprise may be affected by the reliance on third-party user authentication.

Some approaches include authentication of a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to confirm the access attempt from the user. In this manner, such systems may supply additional factors by which additional confidence may be obtained regarding a user's identity, as merely compromising a user's username and password would not by itself afford access to secured resources. Some users, however, are prone to clicking through (whether unintentionally or intentionally out of habit) such notifications even if they did not initiate any corresponding access attempt, which can result in an attacker gaining access to secured resources.

Some approaches include requiring a user to carry around on their person a discrete hardware authenticator for the singular purpose of asserting possession of secret credentials maintained by the user on the hardware authenticator. When the user desires to access a secure asset from a device, the user plugs the hardware authenticator into the device to assert possession of one or more secret credentials. Not all devices, however, may include an available interface, like a USB port, to receive the hardware authenticator. Moreover, users may forget to bring along a hardware authenticator or may forget to remove a hardware authenticator attached to a device.

These and other existing techniques impose friction on users and are potentially subject to vulnerabilities. None of which is to suggest that any technique is disclaimed, merely that there are tradeoffs to keep in mind in view of the following disclosure. For example, in a single computing session, a user may be asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Examples include attacks that compromise the client computing device by which the user supplies the supplemental conformation of an access attempt in the out-of-band channel. Some existing systems are potentially vulnerable to malicious code executing on the user's mobile device or other device to which the user inputs credentials that, for example, capture user supplied credentials from system memory. Other examples may include opportunistic attacks resulting from user negligence in leaving a hardware authenticator behind.

Oftentimes, the above approaches to user authentication are incorporated within federated identity systems. The result being that federated identity systems can be further susceptible to one or more of those attacks described above, and the rewards of a successful attack for attackers are far greater than on an individual account basis. For example, a compromised federated identity may afford an attacker access to a wide range of different entities, accounts, protected assets, or any other information accessible under the umbrella of that federated identity. Thus, there exists a need to reduce friction on users while maintaining security. Again, none of which is to suggest that any technique is disclaimed, merely that there are tradeoffs to keep in mind in view of the following disclosure Disclosed embodiments may provide a mobile device-based authenticator and login process by which users may access devices or controlled areas or controlled devices. For example, a user may supplement or supply credentials in an authentication process via a mobile device to access a relying device. In some examples, the mobile device may be registered to access the relying device. Additionally, embodiments may provide a login process by which a user may access one or more web-based services, which may include services and online resources, such as from a relying device to which the user is authenticated.

In some embodiments, the mobile device-based authenticator may confer privileges consistent with traditional techniques that impose more friction on users. For example, a user that uses a mobile device-based authenticator to access a workstation or other relying device (which may include a controller configured to actuate another device or cause a device to perform a function) or a secure resource (e.g., an application, webservice, or other resource) from such a device may be afforded the same privileges as if that user physically provided credentials to the relying device (e.g., username and password) or possessed a key-fob, or code, or key by which the user could access a relying device or controller (e.g., of another device or a door or valve and the like).

In some embodiments, a user registers a mobile device (e.g., a personal or work issued mobile device) for authentication of the user to access relying devices or secure assets via a relying device. For example, a user may register a mobile device which the user frequently uses to establish credentials and key by which the user may be authenticated. For example, the user may be authenticated to access a relying device. Thus, a user may access a relying device based on an authentication result of an authentication process on a mobile phone. In some examples, a relying device may execute a client-side software component that is registered to receive authentication results or pass credentials from the mobile device to a remote server.

In some embodiments a user may authenticate with the mobile device to access one or more web-based to one or more web-based services accessible via the relying device, such as where those web-based services are accessed via credentials other than those conferred by virtue of access to the relying device, or which those which may be subject to additional security measures. Example embodiments may implement various access controls to implement security measures that enhance security of such systems while also reducing user friction by enabling a user to conveniently assert credentials on a mobile device typically carried by the user rather than carry around various single purpose credentialing or access control devices, and the like.

Authentication of a user on a mobile device may be subject to compliance with one or more policies. A policy may specify one or more rules which users attempting to authenticate must satisfy (e.g., via their mobile device) to successfully authenticate. And that authentication may permit assertions based on credentials maintained securely on the mobile device. For example, the mobile device may receive a policy specifying one or more rules with which the user must comply to authenticate and enforce those rules to obtain or generate data for determination of an authentication result (e.g., by the mobile device or other entity, like a server or a relying device). Different relying devices and different web-based services to which a user may be authenticated to access may be subject to different policies. For example, one or more policies may be those of web-based services, which may be governed under a same or different policy than a relying device which may access those web-based services. In some embodiments, policies (e.g., as specified by an administrator for a relying device(s) or relying party(s)) for user authentication may be obtained by a server and provided to one or more other devices or servers for enforcement.

Embodiments may ensure user compliance with a policy in one or more ways, which may include compliance enforcement at one or more of a mobile device level, server level, and relying device level. The different levels may verify compliance with the same or different rules specified by the policy prior to determining an authentication result. In some embodiments, one or more of the rules may be conditioned based, such as to account for different capabilities of different devices. For example, authentication via the mobile device to a given relying device may be afforded on a communication protocol available to both the mobile device and the relying device, without a requirement of the mobile device to have prior knowledge of the communication path type. Rather, the mobile device may broadcast, like a beacon, on one or more available communication protocols, and the relying device may discover broadcasts on supported protocols. Examples may include detecting a beacon signal broadcast over Bluetooth or Bluetooth Low Energy (which may be collectively referred to as "Bluetooth" unless otherwise stated), WiFi or WiFi Direct (which may be collectively referred to as "WiFi" unless otherwise stated), Near-Field Communication "NFC", optical, sound wave (which need not be audible), or other beacon technology capable of emitting a signal which may be obtained by a relying device within a given proximity of the beacon.

Some embodiments described herein provide improvements in computer security that mitigate the capture of user supplied credentials from system memory allocated to client-side authentication applications, even in cases where the capture of such credentials is attempted by intercepting inter-process communication on the client device between the client-side authentication application and security infrastructure on the client device. Some embodiments described herein provide improvements in computer security that mitigate highly sophisticated methods for the capture of user supplied credentials, and some of embodiments incorporate use of and improve upon trusted execution environments (TEEs), like Secure Enclave, ARM TrustZone, or various other trusted platform modules, like those compliant with ISO/IEC 11889 (the contents of which are hereby incorporated by reference), to provide enhanced client-side security. The techniques described in relation to some of those embodiments for mitigating capture of user supplied credentials on client devices may be implemented in connection with various embodiments described herein to configure robust authentication systems apt to prevent unauthorized access to secure assets, like protected data, programs, etc., even in instances where a malicious party has access to a device (or multiple devices) of an authorized party.

Embodiments may confer one or more of the aforementioned benefits or other benefits, some of which will be self-evident to those of ordinary skill in the art and may remain unstated. Some embodiments may protect the credentials a user supplies in an authentication exchange with zero knowledge techniques. Moreover, the zero knowledge techniques may support configurations by which a user can assert credentials for authentication in various ways. For example, some embodiments may maintain credentials or cryptographic keys on a mobile computing device, without those credentials or keys leaving the mobile computing device (e.g., in plain-text or ciphertext form). In some embodiments, credentials, and cryptographic hash values based thereon, or various private cryptographic keys of asymmetric encryption protocols may be stored, for example exclusively, within or by a trusted execution environment, for instance, in a secure memory of a trusted execution environment implemented with a secure co-processor that is separate (e.g., on different silicon, or implemented by different logical blocks connected to different physical memory address spaces) from a central processing unit of the mobile computing device by which an operating system and native applications of the mobile computing device are executed, or in encrypted form within another memory (e.g., of a client execution environment) for which only the TEE or component of the TEE possesses the decryption key. In some embodiments, the zero knowledge techniques may be applied to prevent even the central processing unit of the mobile computing device from accessing such credentials and keys.

In some embodiments, the mobile computing device is a portable device (e.g., having a battery or other integrated power source) that a user frequently carries on or near their person throughout the course of their daily activities. Example mobile computing devices may be a smartphone or smartphone-like devices such as phablets, wearable computing devices, on-board computing devices of automobiles, or tablets with wireless data access. Accordingly, embodiments provide authentication methods which are apt to authenticate a user by involvement of a device users already maintain on their person, such as the mobile device of the user, to confer access to a resource by another computing device, like a laptop or desktop, or a virtualized instance of a desktop, like a virtual machine. In some example cases, authentication values or results generated by a mobile computing device may be determined within a trusted execution environment of the mobile device and thus may convey a high degree of security. However, applications of the disclosed embodiments are not so limited. Mobile device-based authenticators for authentication of a user on a device other than the mobile device may incorporate, be incorporated in, or otherwise function in association with other improvements on credential security and federated identity management systems disclosed herein (which is not to suggest that mobile device-based authenticators are not compatible with other identity management and credentialing systems).

Some embodiments may be implemented in a distributed physical architecture that includes computing devices controlled by diverse entities (e.g., more than 10,000, or more than 100,000 different end users, each using a different pair of devices). In some embodiments, users may operate relying computing devices, like a laptop or desktop computer, which a user may use to log into an online account to access online resources. Other devices may also be suitable for this purpose, such as tablets, netbooks, and the like. These may be referred to as "primary" devices to distinguish them from the secondary device (e.g., like a mobile device, like a smartphone) upon which authentication of the user depends but is not granted access to a secure asset in an authentication session. In other words, the primary device is permitted access to a secure asset by an authentication session under an identity (or account) of a user that is asserted by the secondary device, subject to verification of the assertion. Valid assertions (e.g., those that cause a remote server to permit the primary device to access a secure asset) may be dependent upon 1) authentication of the user to the mobile device, 2) use of a private key or other secret credential, and 3) generation of the assertion with the TEE of the secondary device. As an example, a policy may govern use of a private key, such as by requiring authentication of the user on the mobile device, and results output by the TEE (e.g., a result determined by using the private key) may be signed by TEE (e.g., with the signature being verifiable).

Example Computing Environment

FIG. 1 illustrates an example computing environment 100 within which authentication techniques may be implemented. In some embodiments, the computing environment 100 may include a mobile device 101, a relying device 140, a relying party 145, and an authentication server 155. These components may communicate with one another via a network 121, such as the Internet and various other local area networks. These components may communicate with one another via a network 121, such as the Internet and various other local area networks.

An example relying device 140, like a client device different from a mobile device of the user on which the user authenticates, is illustrated in FIG. 1. The relying device 140 may communicate with one or more of the illustrated entities over a network 121, which may include public or private networks and may include the Internet, telephonic data communications, and the like. The example relying device 140 may be a computing device like a laptop, desktop, or workstation operated with network access in a home, office, or field environment. Some examples of relying devices 140 may execute an OS instance. Other examples of relying devices 140 may include a terminal device or device otherwise configured to provide a user interface for terminal access to one or more computing devices or virtual machines that may include or provide access to a secure asset or be a secure asset themselves.

In some examples, a relying device 140 may operate within a virtualized desktop environment. Thus, rather than utilizing a local OS instance, a virtual machine "VM" may execute a desktop image and the relying device 140 receives data (e.g., the virtualized desktop) for display over a network session with the VM. A virtualized desktop may be persistent or not. In a persistent configuration, a desktop image which a user accesses retains (e.g., includes) user configured or stored data during a session, like installed applications, files, settings, etc. and in a non-persistent configuration an assigned desktop image may be clean-slated on logout or selected from a pool of desktop images and user configured or stored data during a session is not saved or periodically wiped. In the context of clean-slated virtual desktop implementations, or the desire to implement similar principles to credentialing for access to relying devices, the mobile device 101 may serve to retain those credentials which might otherwise be stored on a relying device 140. Embodiments of relying devices 140 or VM implementations may elect to purge credentials and mitigate the retaining of various credentials outside of the mobile device 101 of the user, thus permitting the mobile device executing an authentication application to maintain a wallet of credentials by which the user may authenticate to access (e.g., login to a virtualized desktop on) a relying device 140, or even the relying device itself, and then authenticate to access other applications or services from the virtualized desktop.

In some cases, the relying device 140 may operate on an internal network (not shown) and may or may not have public network access (e.g., network 121) but include a connection on the internal network to one or more of servers 145, 155 or other server that may have or afford public network access. Some configurations may allow tunneling into an internal network from another network (e.g., a public network) via secure connection such as VPN or other encrypted communication protocol. In some cases, an example internal network may be wholly internal, such as a private network within a corporation, and supports communications between the relying device 140 and server 145 or server 155. Example implementations of the relying device 140 in such instances may be a terminal or workstation within a secure environment (e.g., a server room).

In some cases, the relying device 140 may communicate with a mobile device 101 over a communication path distinct from the network 121. For example, the relying device 140 and mobile device 101 may communicate directly, such as via a variety of different communication methods, which may include, but are not limited to Bluetooth, WiFi, NFC, optical, sound wave, or other communication technology capable of exchanging data between the devices. In some examples, the relying device 140 may receive authentication data from the mobile device 101 via such a communication path to authenticate a user of the mobile device to access a secured asset via the relying device. A service, like a workstation service "WS Service" 125 executed on the relying device 140 may facilitate the exchange of information between the relying device 140 and the mobile device 101 using such communication interfaces without a requirement to modify one or more authentication protocols, such as authentication protocols reliant on hardware authenticators which must be physically coupled to a relying device 140 to provide authentication data.

Different example relying devices 140 may be configured to access different secured assets in a variety of different ways. For example, a relying device 140 may attempt to access a secured asset such as an online resource 147 on or via one or more servers 145. In some embodiments, the relying device 140 may attempt to access the online resource 147 on or via one or more servers 145 using an application 110 installed to the relying device 140. In another example, a relying device 140 may attempt to access a secured asset such as an application 110 that may be executed on the relying device. In some embodiments, the application 110 may also be configured to access an online resource 147 on or via one or more servers 145. In some examples, an application 110 may be a component of an OS instance, and different components of an OS instance may use an authentication service for different purposes. In some examples, a component of an OS instance may authenticate a user to a user-level account of the OS instance from which other applications may be accessed by the user. In some examples, access to the user-level account (or privileges afforded to the user-level account) may depend upon authentication of the user by a remote server.

In association with a given access attempt of a secure asset, a relying device 140 may supply credentials for accessing the secured asset. Those credentials may be supplied in whole, or at least in part, by the mobile device 101. Several examples of which are outlined below. In one example, the secure asset is an online resource 147 on or accessible via one or more servers 145. The online resource 147 may be a server hosted application, application programming interface, user account, virtual machine, or other data or interface accessible by the relying device 140 via the server 145. In some embodiments, the relying device 140 may include an application 110 configured to access the online resource 147. For example, the application 110 may be a web browser configured to request data on and receive data from the server 145 for presentation on a display of the relying device 140. Accordingly, the application 110 may be configured to retrieve data from the server 145 and present the data received from the server to the user. In some cases, the server 145 may redirect the application 110 to retrieve some or all data from one or more other servers, like server 155. The retrieved data, when executed or processed, may cause the application 110 to request credentials for accessing the online resource 147.

In some cases, a user interface element may indicate an option for selection or prompt a user of the relying device 140 to supply credentials via a hardware authenticator. The WS Service 125 may discover the availability of a mobile device 101 broadcasting authentication services and solicit credentials from the mobile device 101 which may be provided to the application 110. In turn, the application 110 may transmit data corresponding to the credentials to a given server (e.g., at least one of server 145 or server 155) specified in the retrieved data for authentication. In some embodiments, the application 110 may transmit data corresponding to the credentials without direct user input of the credentials. In some embodiments, when executed or processed, the retrieved data may cause the application 110 or WS Service 125 to automatically collect or transmit other identifying data corresponding to the user, mobile device 101 or relying device 140 with the credentials. For example, the application 110 or WS Service 125 may collect or generate identifying data about the user-mobile device-relying device combination in the form of cookie, log, token, or other data. In addition, or alternatively, the application 110 or WS Service 125 may collect identifying data about the user-relying device combination, such as by querying the runtime environment on the relying device. All or a subset of the above information may be transmitted to one or more of servers 145 or 155.

In another example, the secure asset may be an application 110 executed by the relying device 140 and configured to prompt the user to supply credentials when the user attempts to use the application or a feature thereof. Similarly, in another example, the secure asset may be an online resource 147 accessible by the application 110 and the application may be configured to prompt the user to supply credentials in response to the user attempting to use the application 110 to access the protected asset via the server 145. The application 110 or WS Service 125 may transmit received credentials to the server 145 or server 155 for authentication. In some embodiments, the application 110 and online resource 147 may both be secure assets, and the user may be prompted to provide same or different credentials when attempting to access different secure assets. In some embodiments, the application 110 or WS Service 125 may be configured to automatically collect or store previously supplied credentials and automatically transmit the collected or previously supplied credentials to the server 145 or server 155 without prompting the user.

In some embodiments, a secure session is established between the relying device 140 and one or more of server 145 or 155 for the transmitting of credentials or the exchange of other data. The secure session may be HTTP over TLS/SSL, SSH or other secure connection type by which the relying device 140 (or applications thereon) can exchange data with a server (or application applications thereon). The secure session may be held open by the server for a pre-configured amount of time (e.g., 1-180 seconds) before timing out to allow enough time for a user to authenticate on the mobile device 101 to facilitate the communication of credentials to the relying device 140. Once authenticated, the relying device 140 may be permitted to access the secure asset. In some embodiments, based on the credentials or user-device information, a server may generate a token tied to that information and transmit that token to the relying device 140. In turn, the relying device 140 may present the token within a set period of time (e.g., 10-9999 ms or 1-180 seconds) after authentication to access a secure asset.

Tokening of the relying device 140 may occur in addition to or separate from the secure session. For example, when attempting to access a secure asset on server 145, the relying device 140 may be redirected (e.g., via HTTP request) to establish a secure session with server 155 and provide credentials or user-device information to the server 155. When the server 155 authenticates the relying device 140, it may pass a token in a redirect (e.g., via HTTP request) that directs the relying device 140 back to the server 145 to access the asset.

Examples of online resources 147 may include a user account, web applications, and other data as described herein. The relying party server 145 is configured to provide access to such resources 147 for authenticated users of relying devices 140. In some embodiments of the relying party 145 may include a user identification repository 160, which may store information about user accounts or clients. For example, the UID repository 160 may store identifying information including one or more of user identifiers, device identifiers, identifying tokens for user or devices, locations of devices on a network, and the like. The UID repository 160 may also store associations between one or more identifiers, for example, a user identifier may be associated with one or more device identifiers to which that user is permitted access or otherwise uses to access the server. In some embodiments, the UID repository 160 may further store credentials associated with the identifying information for users and clients, though it need not be required to.

The relying party server 145 may compare information about or received from the relying device 140 with information stored in the UID repository 160 to determine which user or device is attempting to access a given secure asset, such as the online resource 147, and whether that user or device has been (or is) authenticated. For example, the relying party server 145 may identify a user identifier or a device identifier stored within the UID repository 160 corresponding to the access attempt. In response to determining which user or device is attempting to access the secure asset, such as by determining one or more identifiers stored within the UID repository 160 corresponding to the access attempt, the relying party server 145 may transmit information about the access attempt to the authentication server 155, or determine whether information about the access attempt was already received by the authentication server (e.g., like a token and identifying information by which an authentication result received from the authentication server may be correlated with an access attempt and the access attempt verified based on information presented by the relying device). Examples of such information may include the one or more identifiers determined from the UID repository 160 to correspond to the access attempt, in addition to information received from, or determined about, the relying device 140. The relying party server 145 may receive authentication results in relation to users or devices from the authentication server 155, in some examples prior to receipt of an access attempt by a relying device. An authentication result may indicate whether the user of the relying device 140 has successfully authenticated with the authentication server 155. Based on the authentication result received from the authentication server 155, the relying party server 145 grants (in response to successful authentication) or denies (in response to unsuccessful authentication) the access attempt by the relying device 140. In some examples, the authentication server 155 may transmit identifying information and information (e.g., like a token value) by which the relying party 145 may permit access to a specific user or device presenting corresponding information. If a token is not received within a threshold period of time, the server 145 may deny the access attempt (e.g., by timing out a connection). In other examples, the relying party 145 may determine authentication results (e.g., by performing operations similar to those of the authentication server 155).

In some embodiments, an authentication result may be a token for one or more associated identifiers, and the server 145 may store the token within the UID repository 160 in association with one or more identifiers. One example might be a token and a device identifier for a given device and optionally a user account to which that device identifier corresponds. The token may include an associated timestamp or timestamps that indicate when the token was created or when it expires. In either instance, the server 145 may determine from a timestamp whether a token associated with a given identifier is inactive or active. In accordance with the above example, the server 145 may receive, from the relying device 140 during an access attempt, a token in addition to information previously described. The server 145 may determine, from information stored within the UID repository 160 in response to receiving a token from the relying device 140, whether the received token matches a valid token received from the authentication server 155. The server 145 may also determine, from an association between the valid token and an identifier within the UID repository 160, whether information received from or determined about the relying device corresponds to the identifier stored within the UID repository 160. For example, the authentication server 155 may be configured to cryptographically hash a specific set (and optionally order) of determinable information received from or about the relying device 140 to create an identifier. Similarly, the relying party server 145 may be configured to execute a process in a similar manner to determine an identifier for a relying device attempting to access a secured asset. As the identifier can uniquely identify the relying device 140 from other relying devices, the relying party server 145 can determine to grant the relying device 140 access if the token presented by the relying device matches a valid token in the repository 160 and an identifier determined for the relying device matches the identifier associated with the valid token in the repository 160.

The authentication server 155 may store data for authentication operations in an authorization repository 165. The authorization repository 165 may include a number of UID Records 151. A UID Record 151 may include information associated with a particular user and the devices associated with that user. Some or all of the information stored within the UID repository 160 or representations thereof may be stored within the authorization repository 165 in UID Records 151. In some embodiments, the auth repository 165 is also configured to store data to perform one or more of the functions ascribed the UID repository 160 or vice versa. For example, rather than the relying party server 145 using the UID repository 160, it may instead use the auth repository 165. In such a configuration, the auth repository 165 may be configured to respond to queries to return, store, or otherwise provide data in a similar fashion as the UID repository 160. The data structure of the auth repository 165 may differ from that of the UID repository 160, but one or more queries received at the auth repository 165 from the relying party server 145 may be operable to return and store similar data from the data structure of the auth repository 165. Benefits of such configurations may reduce overhead for relying parties 145 as they can significantly offload authentication burden and reduce storage of user specific data in addition to increasing security.

Information associated with a particular user in a UID Record 151 may include one or more user identifiers (or credentials) that user uses with a relying party, such as a username, email address, employee ID, etc. The user identifiers may also be representations of user identifiers, such as cryptographic hashes of user identifiers, and the cryptographic hashing function may be specific to a given relying party. UID Records 151 may be created by the authorization server 155 when a given user elects to use an authentication application for user authentication to access assets of the relying party. Alternatively, UID Records 151 may be created by the authentication server 155 upon request by a relying party. The request may include user provided account information for generation of a UID Record. In some embodiments, the authentication server 155 may handle user registration for the relying party and receive and process some or all of the user provided information directly to generate a UID Record 151 for the user. A relying party administrator may also provide or otherwise create specified account information for generation of a UID Record, such as when an administrator of the relying party creates an employee account.

A UID Record 151 may include a plurality of constituent device records for devices associated with that user that may be used for authentication or accessing a secure asset or resource. For example, a user having UID record 151 may use a device A for user authentication and a device B for accessing secure assets of a relying party. In some embodiments, device A information may be associated with the UID record 151 when the user registers their mobile device 101 with the authentication server 155. In some embodiments, device B information may be associated with the UID record 151 when the user authenticates on their mobile device 101 to access a relying device 140 or secure asset from a relying device. In some embodiments, device B information may be associated with the UID record 151 based on information received from device B, such as in response to an authentication corresponding to the user being reported from device B. In some cases, all or some of the device B information may be associated with the UID record 151 by an administrator, like a party (which may be a relying party) that determines user (e.g., the user to which the UID record 151 corresponds) privileges. For example, the UID record 151 may indicate which relying devices the user is permitted to access or which relying devices are permitted to access different secure assets for the user. In some cases, a user may be permitted to access a plurality of relying devices and which devices the user is permitted to access may be reflected by identifiers for those devices or a collection of devices within the UID record 151.

By way of example, Device A record may correspond to a mobile device 101 registered with the authorization server 155 for user authentication to access relying devices or online resources. During a registration process, such as one performed through an authentication application 120, initial information about the mobile device 101 may be collected and stored within the Device A record. The initial information may include information operable to identify authentications of the user on the device, some examples of which may include one or more device identifiers associated with the device. The Device A record for the mobile device 101 may also contain credentials A for authentication of a user of the mobile device, such as based on an access request. For example, the Credentials A may include representations of various different credentials provided in a registration process of Device A and a public key for verifying signed data received from Device A. In some examples, the public key, such as when provided in association with authentication data, like a signed data, generated by Device A may also serve as an identifier (e.g., asserted) for Device A by which the record may be identified (e.g., by matching of the asserted public key with a public key of a record).

Device B record may correspond to a relying device 140 to which the user is permitted to access or used by the user to access secure assets subject to authentication of the user on their mobile device. Relying devices need not be registered, and records for relying devices may be created over time as a user uses different relying devices to access secure assets. In some cases, records of such devices may correspond to a device (or devices) reporting an active user session, such as that corresponding to a given user having a device A by which the user authenticated to access a device B or access a secure assets with a device B. In some cases, the relying device 140 may optionally be registered with the authorization server 155 for use by a particular user or to access secure assets of the relying party. Depending on the relying party, there may be multiple device records corresponding to different relying devices used by the user over time. A Device B record for a relying device may be created when a relying device is configured by a system administrator (e.g., of the relying party). In some cases, the Device B may be assigned to a specific user, such as by a UID Record 151. Alternatively, one or more users may be permitted to register with a Device B (e.g., in which case the Device B may be associated with their respective UID Records 151) and different Device B records may be established in association with the UID records of the users. The repository 165 may also store information such as which users are permitted to register with or otherwise access which relying devices and the like. A UID record 151 may include additional or different Device B records (e.g., multiple) over time as a user is permitted to access different relying devices or different sets thereof.

In some cases, a relying device 140 may optionally be registered with the authentication server 155 for use by a particular user or to access secure assets of the relying party.

A Device B record for a relying device 140, like a client-type device, may contain an identifier or other identifying information for the device and optionally credentials B, where those credentials may be in-band credentials (e.g., account/password/token/keys, etc.), representations thereof, or various authenticators for applicable embodiments. In some cases, the ID B may be an address of the Device B, like a network address, or device identifier assigned to the device. In some cases the credentials B may include data by which authenticators corresponding to the Device B may be verified. For example, a certificate may be valid when signed, and credentials B may include a public key and the certificate by which the signature may be verified (and an access request may include a timestamp or other value associated with the signature, which may be incorporated within the signed data such that the mobile device proves possession of the private key corresponding to the public key by signature over specific data in a zero-knowledge proof). Some of those credentials (or representations or authenticators) may alternatively be stored under the UID Record 151 for relying devices 140 in general rather than for a specific relying device. Specific relying device records may provide management oversight where different devices are utilized to access different assets (e.g., with a given license (e.g., a product key) for some secure asset).

In some embodiments, permissions, or policy, may be specified for a UID Record 151 or for a given device. Permissions for a UID Record 151 may, generally, define which assets the user (associated with the UID Record) may access and how the user may access those assets. Permission for a client device (e.g., one registered by an administrator associated with a relying party), generally, may define which users may access the device and optionally what assets that device is permitted to access, which may differ from assets the user (associated with the UID Record 151 of the user utilizing the device) is permitted to access. Similarly, policy information may be stored. Policy information may include the one or more rules by which an access request must comply to verify the request and permit access to Device B, such as by issuing a session to the Device B for the user of the UID Record 151 which requested the access, or for verifying the request and permitting Device B to access a secure asset.

For example, in a business environment context, a relying device 140 may be assigned to a particular employee by an administrator of the relying party and Device B record may be stored under the UID Record of the employee. In other instances, a relying device 140 may be used by multiple employees and a record thereof may be associated with different ones of the UID Records, such as when a user corresponding to a one of the UID Records accesses a given one of the relying devices. Alternatively, in some embodiments, an administrator may associate one or more relying devices to one or more UID Records with specific permissions to restrict use of those relying devices to that specified subset of users or such that only certain devices may access a subset of secure assets.

The auth repository 165 may be configured to respond to queries to return, store, or otherwise provide data corresponding to UID Records 151, such as to the authentication server 155 in association with a registration or authentication process. Some or all of the information stored within the auth repository 165 or representations thereof may be stored within the UID repository 160, such as where a relying party 145 manages a number of relying devices 140, and may implement authentication server functions or services as an internal rather than external service. A relying party 145 may also specify information for records within a UID Repository 160 and those records or data corresponding to those records may be passed to an authentication server 155 for managing authentication operations associated with those relying devices. However, such configurations are not limiting, as a relying party 145 may implement functionality of an authentication server 155 and auth repository 165 for management of relying devices and online resources of the relying party (among access of other relying party resources by managed relying devices), such as within a corporate environment.

Examples of a mobile device 101, as described previously, are typically devices under control of a user and operable to store credentials in a secure fashion, such as portable smartphones and tablet-like devices. However, the above should not be construed to rule out other portable mobile computing devices, such as wearables, like watches or bracelets, that as they become more prevalent may be as equally suited as a smartphone or tablet device to collect credentials from users as well as perform other options disclosed with reference to mobile devices. For example, various smart watches may include trusted execution environments or other secure hardware elements, execute applications, such as an authentication application or other native applications, and collect user credentials and other data described herein. For example, various wearable devices are operable to collect at least some user credential inputs which may be used for authentication processes. In fact, devices such as wearables, may be suitable to reduce intrusion on users while meeting robust authentication policies like those disclosed herein. Additionally, embodiments contemplate wearable devices as companion devices to other types of mobile devices 101, and may collectively participate in some disclosed authentication processes (e.g., a wearable device may provide user input or other credentials to a mobile device of the user which may authenticate the user based on the credentials received from the wearable device rather than require the user to input same or different credentials via the mobile device). Further, disclosed examples contemplate wearable devices as standalone devices which may operate a subset of mobile device functionality suitable for user authentication in at least some embodiments.

Example mobile devices 101 may include a TEE 103 to store credentials 109 in a secure fashion. Further, the TEE 103 may be operable to generate representations of credential values such that those representations can be passed by the TEE to the client execution environment (CEE) 113, and by the CEE 113 to another device, like a server or relying device, without divulging actual credential values. In some embodiments, the representations of credential values may be refreshed or updated within the TEE 103 without requiring a change in credential values. For example, representations of credential values may be dependent on one or more key values or function values used as input in a cryptographic hashing function or encryption algorithm to generate the representations. In turn, the key values or function values may be updated within the TEE 103 to generated refreshed representations, rather than requiring a user to provide a new credential values, which is particularly beneficial in instances where a user may be unable to change a credential value (e.g., for a specific biometric input). As a result, a server 145, 155 may receive and store only the representations of credential values and any data breach cannot disclose user specific credential values. Moreover, in response to any data breach, divulged representations of credential values may simply be discarded and replaced with refreshed or updated representations of credential values. Thus, attackers are limited to targeting individual users. However, in order to ascertain credential values for an individual user, an attacker would need to breach the TEE 103 of the mobile device 101 storing those values. Such a process is time consuming, rarely successful, and would require physical access to a device of the individual storing credential values. Furthermore, because representations are used for user authentication, even if an attacker was successful in obtaining credential values from the TEE of a device, they would only be operable if the attacker knew the current schema for generating a representation thereof after a user reports the device missing or stolen. The end result in view of these mounting difficulties for would be attackers is a highly secure authentication system that mitigates the effectiveness of both specific user targeted and wide scale attacks.

Embodiments of a trusted execution environment 103 may include any isolated execution environment, which may run in parallel (e.g., concurrently with) with a client execution environment 113 (CEE), e.g., a process executed in the context of the OS and having a distinct virtual address space assigned within the physical address space of the memory to which the CPU is connected via a memory bus. Compared to a user-facing client execution environment 113, which may execute the mobile device operating system and most user-facing applications, the trusted execution environment 103 is expected to be more secure and may execute a subset of specific applications (e.g., applications, services, and/or software modules) on the mobile device, like trusted applications or modules for authentication operations, which may include user authentication, payments, digital rights management, and the like. Some of those authentication operations may be performed in an authentication process that permits user access on a different device, like a relying device 140, such as for granting user access to online resources and other assets, payments, digital rights management, and the like. Additionally, the trusted execution environment 103 may store within and/or cryptographically sign data associated with those applications or modules within the trusted execution environment, such as to protect the data from being tampered with, read, and/or modified by an unauthorized entity.

In some embodiments, the trusted execution environment 103 may perform one or more operations responsive to requests received at an interface by which one or more applications within a user-facing client execution environment 113 may request data from or provide data to the trusted execution environment, such as to utilize one or more of the modules within the trusted execution environment 103 for authentication operations. Thus, in some embodiments, a client execution environment 113 may include an application programming interface (API) 104 by which those requests are communicated from the CEE 113 to the TEE 103, and responses thereto are communicated from the TEE 103 to the CEE 113. In some embodiments, the TEE 103 may include an API 104 like that above for facilitating the above communication of data, or may additionally include another API (e.g., in addition to either aforementioned API) or secure operating system for facilitating communication of data between elements within the TEE 103. Thus, for example, once the TEE 103 receives a request or other data for processing, that data can be processed exclusively within (or securely by) the TEE (e.g., without revealing secure data to the CEE). The structure of the trusted execution environment 103 may be logical, implemented in hardware, or a mix of both.

Some embodiments of the trusted execution environment 103 may include a TEE co-processor 105 and TEE memory 107, which may be physically separate from the processor 115 and memory 117 of the client execution environment. For example, some implementation of the TEE memory 107 may include a physically distinct memory address bus from the main processor 115, but which is coupled to the TEE co-processor 105 to support secure communications between them. This is not to suggest that both the co-processor 105/processor 115 or TEE memory 107/memory 117 may not be incorporated in a same package or die or that the co-processor 105 or TEE memory 107 cannot make use of at least some or all of the capabilities of the processor 115 or memory 117 in a secure fashion. In some examples, embodiments of the trusted execution environment 103 may include a TEE co-processor 105 or TEE memory 107 which can be physically separate from but have available the full processing power of the processor 115 or memory 117 of the client execution environment 113. In some embodiments, the TEE co-processor 105 or TEE memory 107 are partially or wholly logically separate, such as by way of a reserved or additional processing core or reserved address space. For example, embodiments of the trusted execution environment 103 may include a TEE co-processor 105 or TEE memory 107, which are logically separated from the processor 115 and memory 117 of the client execution environment, such as by cryptographic isolation of one or more processes, threads, processing cores, or address space, or as secure elements within respective components. Within the trusted execution environment 103, the different trusted applications or modules may also be isolated from one another, such as by cryptographic isolation or other software isolation techniques.

Oftentimes, the trusted execution environment 103 includes at least one keyed hardware component. Keyed hardware components can include a unique cryptographic key or keys for isolating trusted applications or data within the trusted execution environment or to otherwise prevent tampering from the client execution environment 113 or other entity. Keyed hardware components can be substantially tamperproof. For example, the design of the keyed hardware component can be immune to software attacks, and an attacker might have to go to exceptional lengths in physically examining the keyed hardware component (e.g., with highly specialized tools) to even possibly be able to read the key. In some cases, the key may even be stored in a memory configured such that attempts to read the key of the hardware component is destructive to the memory (e.g., causes stored values to change or the memory to change stored values). Thus, under even the most extreme of circumstances, the keyed hardware components can be configured to prevent divulging of their key or keys.

In some embodiments, one or more components operable to solicit credentials from a user may be configured to communicate with the TEE co-processor 105 or memory 117 in ways similar to those described above to provide enhanced security. For example, one or more of the components operable to solicit credentials may be logically or physically isolated from the CEE 113 to support secure communications with the TEE 103. For example, one or more of those components may be physically isolated by couplings through a system bus different from a main system bus. The isolation may also be logical, such as by cryptographic isolation, which may use keys associated with those hardware components operable to solicit credentials. Accordingly, data communications by one or more of those components that is secured by one or more cryptographic keys may, in some configurations, logically flow through or be accessible from the CEE 113 and still be considered isolated as the TEE 103 securely stores a key operable to decrypt the data and that key is not accessible by the CEE 113. As an example, the memory 117 of the TEE 103 may securely store one or more keys operable to decrypt information received from the respective components. In some cases, isolation of one or more components may only be partial, such as where the component also serves a function with the CEE 113. For example, a given component may communicate securely via a separate system bus, cryptographic isolation, or in another secure way (e.g., on a request/response path between the TEE and component) described herein for communications pertaining to the TEE 103 and in an unsecured fashion via a main system bus or without encryption for communications pertaining to the CEE 113.

In some embodiments, the trusted execution environment 103, with the TEE co-processor 105, may execute a process to generate or otherwise store one or more encryption keys 108, which may include one or more keys from a key-pair, such as a pairing of a private encryption key and a public encryption key. One or more generated keys 108, such as generated private keys, may be protected within the trusted execution environment, such as within the TEE memory 107. For example, generated private keys may be isolated from trusted applications within the trusted execution environment by cryptographic isolation. In some embodiments, generated private keys may be encrypted (e.g., for storage) based a cryptographic key of a hardware component, such as a key of one of the TEE co-processor 105 or component associated with the TEE co-processor 104, so that only the TEE co-processor 105 can use a generated private key. For example, a process of the TEE co-processor 105 may access an encrypted version of the generated private key stored within the TEE memory 107 and then decrypt the encrypted version of the generated private key based on a cryptographic key of the hardware component prior to another process utilizing the private key). In this way, a generated private key may be afforded a substantially similar degree of security as that of a cryptographic key of the hardware component. In other words, a malicious actor must cause the hardware component to divulge a key for decrypting an encrypted version of the generated private key prior to being able to use the generated private key (e.g., for a signature). Similarly, the TEE co-processor 105 may encrypt other data stored within the trusted execution environment, either with a generated key, received key, a cryptographic key of a hardware component, or combination thereof. Likewise, the TEE co-processor 105 may decrypt other data, such by decrypting that data with a generated key, received key, a cryptographic key of a hardware component, or combination thereof (such as in instances where some data is encrypted based on a generated private key and stored subsequent to further encryption based on a cryptographic key of a hardware component).

In some embodiments, the TEE 103 may be configured to isolate different data within the TEE 103. For example, some embodiments of the TEE 103 may encrypt different data (e.g., different keys or other data associated with different applications or modules) based on a function that takes as input a cryptographic key, such as a key 108 in TEE memory 107, (which may be a generated key, hardware key, or other stored key) and a value that is altered for the different data. Alternatively, the cryptographic key itself may differ for different data, for example, a function may take as input a cryptographic key of a hardware component and a value that is altered to generate different cryptographic keys for different data. In turn, a function may use different cryptographic keys to encrypt different data within the TEE 103. The value that is altered may be altered deterministically, selected deterministically, generated randomly, output from a linear shift register, or by other method, and the alteration of the value ensures that one module or application within the TEE 103 cannot use a key or data stored within the TEE memory 107 to which it is not authorized.

In contrast to a generated private key of a key pair, which may be maintained solely within the trusted execution environment 103, a public key of the key pair may be shared by the trusted execution environment 103 with the client execution environment 113. Elements outside the trusted execution environment 103 may use the public key of the key pair to encrypt data, which can then only be decrypted with the private key stored within the TEE 103. Similarly, the TEE may sign results or other data output with a function utilizing a private key of a key pair, stored within the TEE 103, and an element outside the TEE 103 may use a disseminated public key of the key pair to verify the signature, and thus verify that the result or other data output was generated by the TEE 103. Thus, for example, the trusted execution environment 103 may execute a process to sign some data with a private encryption key, and a disseminated public encryption key can be used to verify that the trusted execution environment 103 signed the data. In the context of authentication, the data may be a credential value or a cryptographic hash value of the credential value and representative of a user authenticating a request to access online resources.

In some embodiments, the TEE 103 and CEE 113 communicate information by way of one or more application programming interfaces, such as an API 104. Some embodiments of the API 104 are implemented in or by firmware stored to non-volatile memory of the mobile device 101, which can sometimes be a memory space separate from the TEE Memory 107 or Memory 117 and specify underlying functions available to the CEE 113 for communicating with the TEE 103 (e.g., like a Basic Input/Output System "BIOS"). Some embodiments of the API 104 may include one or more drivers to facilitate communications with hardware components, such as of the CEE 113 or TEE 103. In some embodiments, the API 104 and drivers may be considered separate, but may be layered, like in a stack, whereby the API 104 provides higher level functions and the drivers facilitate operations associated with those functions. Different configurations may include the example API 104 or other elements supporting API functionality, like drivers, in different locations. Some embodiments may include the API 104 within the CEE 113, within the TEE 103, within an element having a physical interface with the TEE 103 or CEE 113, in firmware of the mobile device 101 (e.g., in a BIOS), or combination thereof. Some embodiments of the TEE 103 may include a monitor to monitor a system bus for requests from an API 104 (or driver). Oftentimes, the location of the API 104, drivers, or other elements depends on the physical or logical structure of the TEE and CEE, which can vary between different implementations. However, regardless of the specific implementation, an API 104 may be configured to provide an interface by which at least some data or results determined within the TEE 103 may be passed to the CEE 113 and by which at least some functions performed within the TEE 103 may be requested by the CEE 113. Further, requests for at least some of those functions may include data or arguments for performing at least some of those functions on the data.

An example API, such as API 104, may be configured to receive requests from elements (e.g., a given application, module or interface) within the CEE 113 and communicate those requests to an appropriate element (e.g., a given application, module, or interface) within the TEE 103. In some embodiments, the API 104 translates a received request from a schema compatible with the CEE 113 to a schema compatible with the TEE 103. In some cases, that may include translating a request in one schema into multiple lower-level requests in another schema. In some embodiments, the API 104 may communicate one or more requests in a schema compatible with the TEE 103 over a system bus, which the TEE 103 may include an interface or monitor to detect those requests for processing within the TEE 103. Example requests may include a request to generate a cryptographic key or key pair, solicit credentials, verify credentials, or otherwise perform a function provided within the TEE 103, such as the various operations of the TEE described herein. In turn, one or more elements within the TEE 103 may process a request and optionally return a result of processing the request to the API 104. In some embodiments, the TEE 103 processes a received request in a schema compatible with the TEE 103 and return results according to that schema. For example, the TEE 103 may include an interface or monitor to provide results back to the API 104, such as over a system bus. The API 104 may translate results received from the TEE 103 into a schema compatible with the CEE 113. In some cases, that may include receiving multiple results from the TEE 103, some of which may be used in subsequent requests to the TEE 103, prior to returning a result in a schema compatible with the CEE 113 in response to a request received from the CEE. The API 104, in turn, may communicate a result to an element having initiated a request or other specified element.

In addition to the trusted execution environment 103, the mobile device 101 includes a client execution environment 113. The client execution environment 113 may include a processor 115 and memory 117 configured to perform operations within the client execution environment. For example, the client execution environment 113 may include an operating system (not shown) and one or more applications. Some of the applications may be native applications, which generally, are developed for use on a particular platform or device, such as the mobile device 101. Thus, for example, a native application may be loaded into memory 117 and executed by the processer 115 within the client execution environment 113.

The authentication application 120 may be an application, like a native application, configured to execute within the CEE 113. The authentication application 120, like other native application applications, may be downloaded to the mobile device 101 and subsequently installed, such as by a user of the mobile device 101. Alternatively, the authentication application and one or more other applications, like some other native applications, may be preloaded on the mobile device 101 or included in an operating system of the mobile device.

Once installed on the mobile device 101, the authentication application 120 may be loaded into memory 117 and executed by the processer 115 within the client execution environment 113 to perform one or more of the operations described herein. In some embodiments, the authentication application 120, when executed by the processor 115, includes a registration process that is executed to register the authentication application 120 with a server (e.g., server 145 or server 155). During the registration process, the authentication application 120 may communicate or otherwise establish identifying information about the user and the mobile device 101 with the server. Example communicated information and data may include one or more keys 108, a digital signature of data based on a key 108, cryptographic hashes of credentials 109 or other user or device 101 specific information and data stored within the TEE 103. Example communicated information may further include one or more preferences or setting pertaining to credentials the mobile device 101 is operable to or configured to obtain (e.g., directly or from a wearable or other device) or credentials the user is willing to use (e.g., password, faceprint, fingerprint, etc.). Example communicated information may further include policy information governing use of different credentials and properties thereof. Policy information may be stored on the mobile device 101 or the server. Policy information may be updated for different secured assets.

The authentication application 120 may advertise user authentication services via one or more communication interfaces of the mobile device 101, such to nearby relying devices 140 having at least one of the communication interfaces (e.g., to detect an advertisement). The authentication application 120 may advertise services while executing, such as while the application is in focus (e.g., when the user is accessing the application), or in some cases may utilize a background service to advertise authentication services and a response may prompt the user to execute or bring the authentication application into focus.

A relying device 140 may respond to an advertisement, such as by requesting authentication of the user. The authentication application 120 may display information about the request, such as information about the relying device and what the user is being requested to authenticate to (e.g., a user account of the relying device, a user account of a relying party, etc.). In turn, the user may elect whether to respond to the request for authentication, such as based on whether the user is attempting to access the indicated relying device or indicated asset via the relying device.

The authentication application 120 may be configured to interface with the TEE 103, such as via the API 104, in response to receipt of a request from a relying device 140 for authentication of a user. For example, the authentication application 120 may query the API 104 or a native application to solicit or otherwise collect a credential input from a user. In turn, the authentication application 120 interfaces with the TEE 103 to obtain a result for the credential input by the user. The credential input, whether biometric, pin, alphanumeric password or other, may be processed within the TEE 103 to determine a result. The TEE 103 may process the credential input responsive to one or more requests or commands received from the authentication application 120 via the API 104. In some cases, the result may include an indication of whether the input credential matches a stored valid representation of the credential 109 or does not match the stored credential. If the input credential matches the valid representation within the TEE 103, the result may be cryptographically signed within the TEE 103. In turn, an entity in possession of a public key corresponding to a private key by which the result was signed may verify the result responsive to the signature indicating the user authenticated with the device 101. In some cases, the result may include a cryptographically signed input credential or hash (which may be a cryptographic hash) thereof for matching and verification.

The authentication application 120 may be configured to establish a session defining a secure channel with the TEE 103 to protect data communications between the authentication application and the TEE. For example, the authentication application 120 may be configured to generate an identifier and provide the identifier to the TEE 103, such as via the API 104. The identifier may be tied to the authentication application 120, determined at random, selected deterministically (e.g., based on a register value, system time, etc.), or a combination thereof, such as concatenation of an identifier tied to the authentication application 120 and a current system time. Further, the identifier may be determined by a processing of the data described above, such as by input of the data into a cryptographic hashing function or key generation algorithm to generate the identifier. In turn, the TEE 103 may return a session bound to the identifier such that other applications cannot access data transmitted between the authentication application 120 and the TEE 103, which can include data created during the session. The data created and transmitted during the session may include one or more keys, results, or other requests and responses generated during the session. For example, during a session, the user may establish one or more credentials 109 in TEE memory 107 for use with the authentication application 120. The established credentials 109 may include cryptographic hashes or other ciphertext of credential values whether biometric or alphanumeric, such that those representations may be passed to a server, like authentication server 155 or relying party server 145, for authentication operations without divulging actual credential values. In addition, or alternatively, the established credentials 109 may include unique signature information from the TEE 103 (such as a public key) that is passed to the authentication server 155 or relying party server 145 such that signed data (with a corresponding private key) output by the TEE can be verified as originating from the TEE.

Example native applications, such as the authentication application 120 or other native applications supporting authentication application functionality, may detect, collect, or otherwise support user inputs, such as a selection of a user interface element, and cause an operation corresponding to the selection. In some cases, a native application may prompt the user to provide a specific input in response to a request for authentication. In other cases, a native application may evaluate continuously provided inputs (such as from a biometric sensor) in response to a request. In some example embodiments, a native application may evaluate, prompt, or otherwise obtain multiple different user inputs. In either case, example native applications may interface with (or provide an interface on) one or more different components of the mobile device 101 or communicatively coupled devices, such as fingerprint sensors, image sensors, display of software or interface with hardware keyboards, etc. as well as other types of components or biometric sensor devices operable to obtain corresponding user input types. In some embodiments, the TEE 103 may interface via an API with such native applications to securely collect input credentials.

Examples of user input can include selection of one or more characters or digits on a keyboard (e.g., displayed within an interface on a screen of the device or coupled to the device) and receipt of selected characters or digits, which may correspond to a personal identification number, password, or other keyed input. Other similar examples may include input/selection of a pattern or other combination of user interface elements on a screen. Further examples of user input can include selection of a user interface element to capture an external input indicated by the element, such as inputs pertaining to the user, which may include image data from an image sensor or other sensor, like a fingerprint sensor, or other biometric sensor operable to collect biometric input pertaining to the user when the user interacts with the sensor. User input may not be explicit, but rather involve detection of and capturing the input, such as by requesting the user position their face or component performing facial recognition in a position that enables capture of the input. In some embodiments, a native application may communicate with one or more external devices to capture external input, like a wearable device comprising one or more biometric sensors operable to collect biometric input pertaining to the user when the user interacts with the sensor. In some embodiments, some types of biometric input (e.g., heart rhythm, blood pressure, body temperature, etc.) may be evaluated on a continual basis or for a trailing duration of time from a current time where those biometric inputs may be individually or a collection thereof indicative of a particular user after a sufficient period of time; and other types of biometric input (e.g., facial image, fingerprint, eyeprint, etc.) may be evaluated upon receiving particular sensor input requested from the user that are indicative of a particular user at time of collection.

Some example native applications may interface, via the API 104, with the TEE 103 to securely collect and subsequently store, in the TEE 103, various ones of valid representations of user credentials 109 for authenticating user input received from the various ones of the native applications. In some embodiments, the secure collection includes one or more secure communications between the TEE 103 and a component operable to collect the credential, and that process may be initiated by a native application through a request to the API 104. In turn, a user may establish valid representations of different user credentials 109 when setting up their mobile device 101 upon purchase, activation, or update thereof, such as by inputting a password, setting up a faceprint, fingerprint, eyeprint, etc. or otherwise setting up or permitting different types of credentials for protecting data on the mobile device 101. In many cases, an operating system of the mobile device 101 or various ones of the native applications request that a user input various credentials during set-up of the device or upon installation or use of the application. Accordingly, one or more valid representations of user credentials 109 may be established or updated within the TEE 103. As described above, the user credentials 109 as they pertain to different applications may be isolated by the TEE 103. Thus, storage of a valid credential may be specific to a given application (e.g., by encryption with a key different from other keys for other applications), even where the credential itself may be the same for some other applications.

Similarly, a native application or operating system of the mobile device 101 may interface, via the API 104, with the TEE 103 to securely authenticate a user based on the user providing input that matches a valid representation of a corresponding credential 109. In some embodiments, the authentication includes one or more secure communications between the TEE 103 and a component operable to collect the credential to receive user input for the credential within the TEE, and that process may be initiated by a native application through a request to the API 104. The received user input may be processed within the TEE 103 for a comparison to a valid representation of the corresponding credential 109 and the native application, via the API 104, may receive a result indicating whether the user was authenticated based on the user input.

In some embodiments, use of one or more of those credentials may be subject to policies implemented by an authorization server 155 providing authentication services or relying party 145 providing access to secured assets, such as online resources, subject to authentication by the authentication service. For example, the authentication server 155 or relying party 145 may accept or deny use of the different ones of the user credentials 109 or specify requirements for acceptance of different ones of the user credentials 109 for authentication for different secure assets. As an example, passwords not meeting certain criteria (e.g., length, randomness, number of unique characters, etc.) specified by a policy to access a given secure asset may be denied. As a result, the user may choose to establish new credentials 109 meeting the policy or a different credential 109 (e.g., of a different type) that meets criteria of the policy may be used. In another specific example, a policy for accessing a given secure asset may dictate that facial recognition credentials may be denied for a subset of mobile device 101 models, brands, or operating systems that are determined to provide insufficient results in securing the device against attack methods (e.g., are easily thwarted by a printed picture or model of a user's face). As a result, for users of devices belonging to that subset of mobile devices, different credentials 109 that meet criteria of the policy may be used.

Example Environment for Credential Exchange

Figure 2:
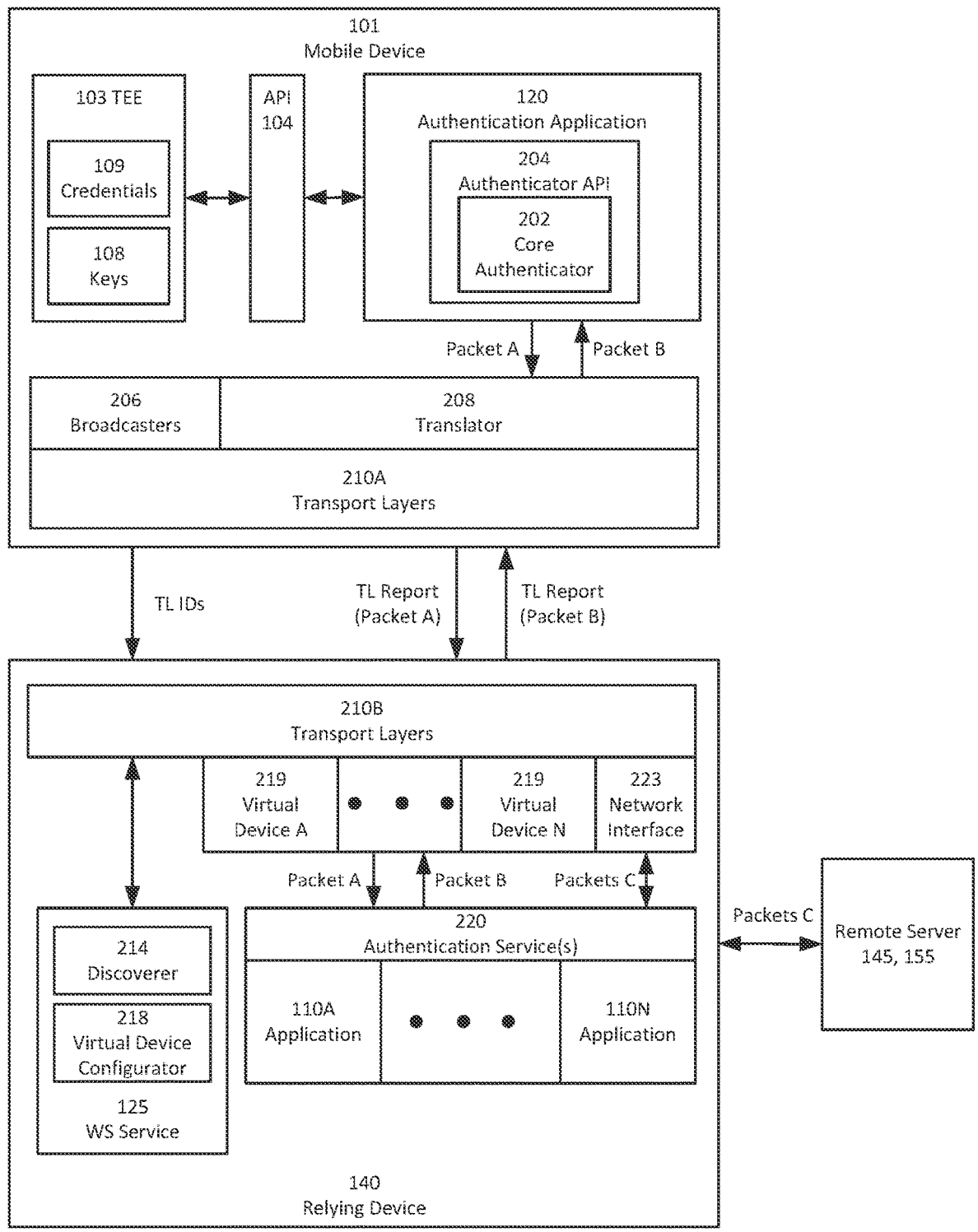
FIG. 2 is a block diagram showing an example of an environment for credential exchange by which the present techniques for user authentication may be implemented.

FIG. 2 illustrates an example computing environment 200 within which credential exchange techniques between a primary device and secondary device may be implemented. In some embodiments, the environment 200 may include a mobile device 101 and a relying device 140. The mobile device 101 and relying device 140 may communicate with one another via one or more communication protocols, examples of which may include, but are not limited to, Bluetooth or Bluetooth Low Energy "BLE", WiFi or WiFi Direct, Near-Field Communication "NFC", optical, sound wave (which need not be audible), or other technology capable of the wireless exchange of data, such as directly between two devices within a given proximity.

An example mobile device 101 may include an authentication application 120, which may perform operations like those discussed with reference to FIG. 1, in addition to operations like those discussed in detail below. An example relying device 140 may include a relying device-side authentication component, like a workstation service application 125, which may perform operations like those discussed with reference to FIG. 1, in addition to operations like those discussed in detail below, and one or more applications 110, that rely on one or more authentication services by which a remote server (e.g., like server 145 or 155) may authenticate a user (e.g., to a user account) to access an application or access a secure asset with an application.

In some examples, an application 110 may be a web browser configured to request data on and receive data from remote servers for presentation on a display of the relying device 140. Accordingly, the application 110 may be configured to retrieve data from a server, like a relying party server 145, and present the data received from the server to the user. Some data may be a secure asset, like data accessible by only certain classes of user accounts or one or more specific user accounts (e.g., like a subset of one or more user accounts). To access secured assets, an application 110 may retrieve data corresponding to a log-in interface from the relying party server 145. In some cases, the relying party server 145 may redirect the application 110 to retrieve data corresponding to a log-in interface from one or more other servers, like server 155. In either case, the retrieved data, when executed or processed, may cause the application 110 to present on the display of the relying device 140 a log-in interface or other user interface including options by which a user may authenticate. In some examples, election of an option may cause the server to issue the above noted redirect to another server providing an authentication service corresponding to the selected option.

In another example, a secure asset may be an application 110 executable by the relying device 140 and use of the application (or certain features of the application) may be permitted for only certain classes of user accounts (e.g., active subscription or subscription level) or one or more specific user accounts (e.g., like a subset of one or more user accounts). Access or use of the application 110 or certain features of the application may be permissioned by a relying party server 145 for a user account subject to authentication of a user to the user account. The application may display a log-in interface on the display of the relying device 140 including options by which a user may authenticate. Similarly, in another example, a secure asset may be an online resource hosted by a server (e.g., like a relying party server 145) accessible by the application 110 and the application may be configured to display a log-in interface in response to the user attempting to use the application to access the protected asset. Selection of an option may cause the application 110 to communicate with a remote server (e.g., one or more of servers 145, 155) for authentication of the user to a user account.

As shown, the authentication application 120 executed by the mobile device 101 may include a core authenticator 202 and an authenticator API 204. In some examples, an authenticator API 204 may wrap a core authenticator 202 to avoid forking of code of the core authenticator (e.g., different versions of core authenticator code for different devices, like different operating systems or different TEE packages or configurations). While authentication API 204 wrappers may be OS or TEE specific (or specific to an OS-TEE pairing), or may self-configure from configuration setting options based on reported OS or TEEs or pairing thereof, the core authenticator 202 functionality need not be altered. Accordingly, core authenticator 202 code (e.g., released source code, binaries, etc.) may be vetted by other parties. For example, the core authenticator 202 may be C code and the authenticator API 204 may wrap the C code with an Objective-C (e.g., iOS) or Java JNI (e.g., Android) layer to interface with respective mobile OS applications, interfaces, and TEEs. In some examples, a core authenticator 202 may be a FIDO2 capable authenticator.

In some examples, core authenticator 202 and authenticator API 204 functionality may be combined, e.g., in an authenticator. Accordingly, while various example embodiments describe the above components as having relatively distinct functions, embodiments may combine these functions within a single authenticator module that may expose functionality similar to that discussed with reference to the API and implement processes like those discussed with reference to the core authenticator.

In some examples, the authenticator API 204 and core authenticator 202 can be distributed as a SDK that may be incorporated into existing mobile applications, such as existing authentication applications 120. Moreover, as the same source code or binaries of the core authenticator 204 can be expected across different devices, tampering with the code may be rendered evident by a verification check, like a comparison of a checksum or cryptographic hash of the code (e.g., of a binary or file) against an expected value corresponding to vetted code. Some example embodiments may output verification check data in output results (e.g., by which a remote server may verify that core authenticator 202 has not been tampered with). The core authenticator 202 may include externalized configuration settings, which may be set via the API wrapper. For example, some embodiments of the authentication application 120 may determine information about the TEE 103 of the mobile device 101, like information about available services and hardware by which data used by the authenticator may be processed within the TEE, such as by one or more functions (e.g., encrypt/decrypt, credential or key storage, signing of data, signature verification, etc.). Thus, for example, capabilities of the TEE 103 may be leveraged for processing of data for the core authenticator 202. In some examples, functions of the authenticator 202 may be executed within the TEE 103, and results of the processing may be made available within the CEE via the API 104. Examples of functions that may be executed within the TEE 103 may include, but are not limited to, read/write of data, request and processing of biometric authentication, authentication prompt of the user, secure credential input interfaces, generation and storage of private keys, signing of results, etc. Thus, embodiments may leverage the TEE 103 to securely process data by configuration of the externalized configuration settings according to the capabilities of the TEE 103. In some embodiments, configuration settings may be set by the authentication application 120 based on information about the mobile device 101 to which the authentication application is installed on or by which it is executed. For example, externalized configuration settings may be set based on a device identifier, like a model number, serial number, hardware revision (of the mobile device 101 or the TEE 103) or other factors, at time of installation or execution of the authentication application 120.

The authenticator API 204 exposes an interface having an external schema expected by applications and components of a given OS/TEE. Requests received at the interface may be translated to an internal schema compatible with the core authenticator 202. Outputs of the core authenticator 202 in the internal schema may be translated to the external schema for reporting to the applications and the component of the given OS/TEE. For example, the authenticator API 204 may identify callbacks (FIDO2 Authenticator delegate interface) for core authenticator 202 functions (e.g., reading/writing files, requesting a biometric authentication, prompting the user, etc.). Thus, for example, the authenticator API 204 may implement functions consistent with the WebAuthn standard (Web Authentication: An API for accessing Public Key Credentials—Level 2, W3C Recommendation, 8 Apr. 2021, https://www.w3.org/TR/webauthn/, the entire contents of which are incorporated herein by reference). In another example, the authenticator API 204 may implement functions consistent with smart card standards (i.e., ISO/IEC 7816 compliant, the entire contents of which at the time of filing being incorporated herein by reference). The respective standards describe files and data elements, various commands used by application programming interfaces, biometric verification, and cryptographic services for respective authentication protocols that may be implemented by embodiments consistent with the techniques described herein.

The authenticator API 204 may expose commands to configure, start, and stop the authenticator, and may report status of the authenticator, such as to other components to advertise status. For example, advertisement of a start condition may cause one or more broadcasters 206 of the mobile device 101 to advertise authentication service availability on one or more communication interfaces of the transport layer 210A. In some examples, the authenticator 202 may be started by the authentication application 120 while in the foreground of a user interface of the mobile device (e.g., after a user launches the authentication application 120 or changes a UI focus to the authentication application). Similarly, the authentication application 120 may stop the authenticator, such as based on detection of a UI event that changes focus to another application. The authentication application 120 may support functionality of the authenticator 202 via the authenticator API 204, such as by reading and writing files, performing gestures, or requesting biometric authentication in response to callbacks received from the authenticator 202 via the authenticator API.

The authentication application 120 may receive and output data on various communication interfaces represented by transport layers 210A to communicate with relying party devices 140. For example, the authentication application 120 may output packets of information (e.g., TL Packet A) for transmission via one or more transport layers and receive packets of information (e.g., TL Packet B) from one or more transport layers. The different transport layers 210A may correspond to different communication protocols over which the mobile device 101 may communicate with other devices, such as relying devices to exchange data.

The WS service 125, applications 110, or authentication services 220 may receive and output data on various communication interfaces represented by transport layers 210B to communicate with mobile devices 101. For example, an authentication service 220 may transmit packets of information (e.g., TL Packet B) via one or more transport layers and receive packets of information (e.g., TL Packet A) from one or more transport layers. The different transport layers 210B may correspond to different communication protocols over which the mobile device 101 may communicate with other devices, such as mobile device 101 to exchange data. The WS service 125, applications 110, or authentication services 220 may also receive and output data on a communication interface, like a wired or wireless network interface coupled to a network, like the internet, which may correspond to a different one of the transport layers 210B than by which the mobile device 101 and relying device 140 exchange data. More specifically, the mobile device 101 and the relying device 140 may exchange information directly while information exchanges between the relying device 140 and a remote server 145, 155 may be conveyed over a network. For example, an authentication service 220 may transmit (or cause an application 110 to transmit) packets of information (e.g., Packets C) to a remote server 145, 155 and receive packets of information (e.g., Packets C) over a wired or wireless internet connection.

In some examples, such as in the case of WiFi and WiFi Direct, while a communication interface, like a WiFi receiver/transmitter of transport layer 210B may be used for either wireless communication type, the mobile device 101 and the relying device 140 may exchange information (e.g., TL Packets A, B) over WiFi Direct (e.g., directly, not over a network) protocol while information exchanges (e.g., Packets C) between the relying device 140 and a remote server 145, 155 are routed through a network (e.g., not directly). For example, the relying device 140 may connect to an access point of a network, such as the internet, via a WiFi connection to exchange information (e.g., Packets C) with a remote service 145, 155 through the network.

A transport layer 210A may wrap an outbound Packet A in a transport protocol, represented by TL report of Packet A, such as for wireless communication to a relying device 140. For example, a TL report of packet A may be a wireless signal transmitted over a wireless communication protocol that includes the information of packet A in one or more packets structed in accordance with the wireless communication protocol. Example wireless communication protocols may include, but are not limited to Bluetooth, WiFi, NFC, optical, sound wave, or other wireless communication protocol. In some examples, a transport layer 210A may divide a Packet A into multiple packets or transmit Packet A data as a bitstream. A packet or multiple packets or bitstream data for a TL report Packet A may, in some examples, include error-correcting codes or bits by which a receiving entity may determine whether there exists any transmission errors in a received packet, packets or bitstream data or other received data corresponding to Packet A, examples of which may include parity bit (or bits), checksums, etc. In some examples, TL report Packet A data may include information by which one or more bits or packet information may be recovered without retransmission (e.g., after detection of an error that satisfies correction criteria).

Similarly, a transport layer 210B may wrap an outbound Packet B in a transport protocol, represented by TL report of Packet B, such as for wireless communication to a mobile device 101. For example, a TL report of packet B may be a wireless signal transmitted over a wireless communication protocol that includes the information of packet B in one or more packets structed in accordance with the wireless communication protocol. Example wireless communication protocols may include, but are not limited to Bluetooth, WiFi, NFC, optical, sound wave, or other wireless communication protocol. In some examples, a transport layer 210B may divide a Packet A into multiple packets or transmit Packet B data as a bitstream. A packet or multiple packets or bitstream data for a TL report Packet B may, in some examples, include error-correcting codes or bits by which a receiving entity may determine whether there exists any transmission errors in a received packet, packets or bitstream data or other received data corresponding to Packet B, examples of which may include parity bit (or bits), checksums, etc. In some examples, TL report Packet B data may include information by which one or more bits or packet information may be recovered without retransmission (e.g., after detection of an error that satisfies correction criteria).

Packets (e.g., Packet A) may be output by the core authenticator 202 (or authenticator API 204) in accordance with a given authentication protocol, and in some cases may be structured for transport over a physical wired connection between the core authenticator and a bus of the relying device 140 (though, as explained below, there is no requirement for a physical wired connection to a bus). For example, Packet A may be a packet for communication over a USB or other wired interface onto a corresponding bus of the relying device. Packet A may have a schema of an authentication protocol, like a client-authenticator "CTAP" protocol.

Similarly, Packets (e.g., Packet B) may be output by an authentication service 220 (or WS Service or Application including such a service) in accordance with a given authentication protocol, and in some cases may be structured for transport over a bus of the relying device 140 on a physical wired connection to an authenticator (though, as explained below, there is no requirement for a physical wired connection between the bus and authenticator). For example, Packet B may be a packet for communication on a USB to device coupled to the USB or other wired interface. Packet B may have a schema of an authentication protocol, like a client-authenticator "CTAP" protocol, similar to Packet A. Thus, for example, Packets A and B may conform to the CTAP protocol (i.e., as defined by the Client to Authenticator Protocol (CTAP) Proposed Standard, Jun. 15, 2021, https://fidoalliance.org/specs/fido-v2.1-ps-20210615/fido-client-to-authenticator-protocol-v2.1-ps-20210615.html, the entire contents of which are incorporated herein by reference). In another example, the Packets A and B may conform protocols for Interfaces for Personal Identity Verification (i.e., SP 800-73-4, Interfaces for Personal Identity Verification, https://csrc.nist.gov/publications/detail/sp/800-73/4/final, the entire contents of which are incorporated herein by reference) that define communications with ISO7816 compliant smart cards.

At least some example transport layers 210 operable for communications between mobile devices 101 and relying devices 140 may be bandwidth constrained. Examples of which may include NFC, optical, and soundwave transport layers, among others. Accordingly, a lightweight encoding, like concise binary encoding "CBOR" (See C. Bormann; P. Hoffman. Concise Binary Object Representation (CBOR). October 2013. Proposed [RFC7049] Standard. URL: https://tools.ietf.org/html/rfc7049, the entire contents of which are incorporated herein by reference), may be used to encode Packets A, B prior to transport layer wrapping and communication between mobile devices and relying devices (e.g., to reduce bandwidth requirements to exchange TL Report A, B packets.

In some examples, bespoke rules may be employed in an authentication protocol to encode Packets A, B prior to exchange. For example, a CTAP CBOR encoding schema may specify rules for integers, strings, and simple values such as:

1) Integers must be encoded as small as possible.
   a. 0 to 23 and −1 to −24 must be expressed in the same byte as the major type;
   b. 24 to 255 and −25 to −256 must be expressed only with an additional uint8_t;
   c. 256 to 65535 and −257 to −65536 must be expressed only with an additional uint16_t;
   d. 65536 to 4294967295 and −65537 to −4294967296 must be expressed only with an additional uint32 t.
2) The representations of any floating-point values are not changed.
3) The expression of lengths in major types 2 through 5 must be as short as possible. The rules for these lengths follow the above rule for integers.
4) Indefinite-length items must be made into definite-length items.
5) The keys in every map must be sorted lowest value to highest. The sorting rules are:
   a. If the major types are different, the one with the lower value in numerical order sorts earlier.
   b. If two keys have different lengths, the shorter one sorts earlier;
   c. If two keys have the same length, the one with the lower value in (byte-wise) lexical order sorts earlier.

Other rule sets may specify encodings for arrays, maps, and tags. In some examples, a packet may be constructed to include data corresponding to multiple constituent packets. For example, a number of packets conforming to the CTAP CBOR schema may be packaged in a single packet (e.g., TL Report) conveyed between the mobile device 101 and the relying device 101. Thus, for example, the authentication application 120 or application service 220 may act on a set of constituent packets, such as to authenticate a user to a corresponding set of services in a streamlined manner (e.g., rather than using a separate exchange for each service in sequential fashion, which is not to suggest that such configurations are disclaimed or that a user cannot authenticate on the mobile device 101 sequentially to different services with a corresponding series of TL Reports sent to the relying device 140).

Because some authenticators are memory constrained, the depth of nested CBOR structures used by message encodings may be limited to at most four levels of any combination of CBOR maps or CBOR arrays. In some examples, the authentication application 120 supports structures having a depth of greater than four levels of a combination of CBOR maps or CBOR arrays to communicate additional factors like those described above, which may be parsed by the WS Service 125 or a virtual device 219 to reconstruct individual packets having a four or less levels and those reconstructed packets may be passed to the authentication services 220. However, in some examples, some authentication services 220, or an API wrapping a set of authentication services 220 may support additional levels, such as to afford additional capability to mobile devices implementing authenticators in accordance with the techniques described herein. In other examples, the authenticator, authentication services, and servers supporting those services do not use more than more than four levels of CBOR nesting. Moreover, example use cases of a mobile device for authentication may support processing of packets (or messages, like contents of a packet) having a size greater than the 1024 bytes supported by many authenticators. For example, the authentication application 120 may cause the mobile device 101 to broadcast (or respond to a relying device 140 with) a supported message size greater than 1024 bytes, like 2048 or more bytes, which may support values or parameters convey via additional fields, such as for authentication to a set of services. In some embodiments, a size of packet or message supported may be communicated with a number of depth levels accepted, e.g., where greater than four, to indicate support for a richer set of options, and the depth and additional fields may support authentication to a suite of services in a single authentication session with different keys or assertions of user credentials other than based on private keys, such as based on a set of biometric credentials or biometric and pin or other combination of credentials.

As noted above, disclosed techniques need not rely on a wired physical connection between the mobile device 101 and the relying device 140, like a wired connection to communicate over a USB. However, an authentication service 220 (or WS Service or Application including such a service) may be configured to communicate with a hardware authentication device over such an interface. In other words, an authentication service 220 may (and, in some examples, only) be responsive to authenticator outputs (e.g., Packet A) on a USB and may (and, in some examples, only) provide authenticator inputs (e.g., Packet B) on the USB, thus being reliant on a physical connection over the bus to a hardware authenticator. To overcome this and other deficiencies in such implementations, a WS Service 125 executed on the relying device 140 may facilitate the exchange of information (e.g., Packets A, B) between the relying device and the mobile device 101 over other interfaces without a requirement to modify the authentication service 220 (or the authentication protocol by which it communicates with other components).

The WS Service 125 may include a discoverer 214 and a virtual device configurator 218. The discoverer 214 may interface with a device discovery service of an operating system of the relying device 140. For example, the discoverer 214 may interface with a NT service (e.g., Windows OS) or LaunchDaemon or similar Daemon (e.g., macOS or Linux-based OS) that performs device discovery on interfaces that use transport layers 210B. The discoverer 214 may interface with the device discovery service to detect available devices, such as available authentication devices, like mobile devices 101, within range of a communication interface of the relying device 140 based on detection of a signal emitted by a mobile device 101, like a beacon signal, on a corresponding interface. In turn, the relying device 140 and mobile device 101 may exchange data via the corresponding interfaces of their respective transport layers 210.

As shown, the mobile device 101 may include broadcasters 206, which may be configured by the authentication application 120 (or called by the authentication application) to cause one or more communication interfaces of the transport layers 210A to emit beacon signals, such as to advertise services, like an authentications service, provided by the mobile device to other devices, like relying devices 140. The broadcaster 206, in some examples, may advertise on communications interfaces that support a specified transport protocol for authentications. For example, if a TCP/UDP transport is specified for user authentications, the broadcaster 206 may advertise on DNS or Wifi Direct (and not Bluetooth, for example).

The discoverer 214 may interface with a device discovery service of the relying device 140 to view detected devices based on the beacon signals received on corresponding communication interfaces of the transport layer 210B. Thus, for example, a mobile device 101 emitting a beacon signal may be detected by the device discovery services of the relying device 140 and the discoverer 214 may determine that the mobile device is advertising an authentication service as being available on a communication interface of the transport layer 210B. Examples of authentication services advertised by the mobile device 101 and that may be detected by the discoverer 214 may include advertisement of FIDO2 standard compliant or smart card standard authentication services.

In some examples, zero-configuration networking may be used to exchange information between a mobile device 101 and the relying device 140. Zero-configuration networking protocols may support service discovery, address assignment, and hostname resolution. For example, a zero-configuration networking protocol, like Bonjour, may resolve an address of another device, and devices may report services (e.g., like an authentication service, in the context of an example mobile device 101 including an authentication application including an authenticator) that a device offers to other device using Domain Name System "DNS" service records, which in some examples may be multicast DNS service records "mDNS." Thus, for example, a device may address a TL report packet to another device, and vice versa, to communicate information.

The discoverer 214 may pass information about detected devices advertising authentication services to the virtual device configurator 218 and the virtual device configurator 218 may configure a virtual device 219 based on the received information. For example, the virtual device configurator 218 may configure a virtual device 219 as a USB chip card interface device (CCID) in response to an advertisement indicative of a smart card authenticator or a USB human-interface device "HID" driver in response to an advertisement of a FIDO2 authenticator. The discoverer 214 may also pass information about the communication interface of the transport layer 210B on which a detected device is advertising an authentication service and the virtual device configurator 218 may configure a virtual device 219 based on communication interface information. In some examples, the discoverer 214 may select a communication interface from a set of interfaces on which a device is advertising authentication services, such as based on connection strength (e.g., SNR) or bandwidth. In some examples, the discoverer 214 may score the different interfaces in the set of interfaces, such as by determining a weighted score based on properties of an interface and information about the signal received on the interface and select a highest scoring interface to exchange information with a detected device advertising an authentication service.

The virtual device configurator 218 may spin up a virtual device 219 based on the information received from the discoverer 214. For example, the virtual device configurator 218 may configure a virtual device based on a selected interface. Different virtual devices (e.g., virtual devices A through N) may be spun up with respect to different communication interfaces, and in some examples, for different detected devices. Thus, for example, a virtual device A may be configured for a given communication interface and, in some examples, further configured to communicate with a given mobile device, such as to key a virtual device A to a given communication interface—mobile device pairing (e.g., for a single authentication session involving the mobile device).

When a new virtual device 219 is created, the virtual device configurator 218 may specify a custom input/output control scheme of the virtual device. For example, the virtual device configurator 218 may configure a transport to be used (e.g., transport type, physical address, port number) with the transport layer 210B (e.g., to send/receive TL Reports) and cause the virtual device to report on a bus of the relying device 140 (e.g., a USB to send/receive on the bus). Accordingly, information received by the virtual device 219 from the transport layer 210B may be conveyed onto the bus and information received by the virtual device on the bus may be conveyed onto the transport layer for transmission by a corresponding communication interface.

In some examples, the WS service 125 may determine whether a pairing is permitted prior to spinning up a virtual device for an authentication session. The WS service 125, in some examples, may store device information about permitted mobile devices 101, like identifiers thereof, or may request permission to spin up a virtual device for a mobile device 101 from a remote server 145, 155 (which may permit or deny the request based on records of mobile devices).

The discoverer 214 may detect when a previously detected device is no longer detected or no longer advertising authentication services. The discoverer 214 may determine to pass information (e.g., identifying the device or connection interface or both) about the previously detected device to the virtual device configurator 218 and an indication that the device is no longer advertising on one or more communication interfaces. The virtual device configurator 218 may remove the corresponding virtual devices 219 based on the information. For example, the virtual device configurator 218 may remove a given virtual device 219 by deleting the virtual device or otherwise causing the virtual device to stop reporting to an operating system as available (e.g., by changing a configuration of the virtual device or indicating the virtual device as being unavailable).

Examples of a virtual device 219 may be a virtual device reporting on a USB (or other bus or interface) of the relying device 140. In some examples, virtual device configurations and operations are defined by a USB HID driver or a CCID protocol. Different virtual devices 219 A-N may be respectively configured to convey information between a respective communication interface of the transport layer and the virtual USB device. As mobile devices 101 including authenticators (which may include, but is not limited to FIDO2 and smart card compatible authenticators) and advertising authentication services are discovered on one or more communication interfaces of the relying device 140, the virtual device configurator 218 may spin up respective virtual devices. For example, upon discovery of a mobile device advertising an authentication service, like a FIDO2 authentication service provided by authenticator 202, over a supported transport layer 210B protocol (e.g., TCP, UDP, Bluetooth, NFC, etc.) via a respective communication interface (e.g., WiFi Direct, Bluetooth, NFC, etc.), the virtual device configurator 218 may create and configure a virtual device 219 A reporting on the USB with the necessary parameters needed to communicate information (e.g., via an authentication protocol, like CTAP, to) the authentication service 220 (and, e.g., receive information from the authentication service and convey that information back to the mobile device).

In some examples, such as in FIDO2 use cases, a virtual device may report to the operating system on the USB as a FIDO2 USB token by providing a set of HID report descriptors. In some examples, the set of HID report descriptors may be based on the authenticator 202 of a mobile device 101. Accordingly, WebAuthn and FIDO aware components may discover the virtual device reporting as a FIDO2 authenticator and communicate with the virtual device using CTAP.

A virtual device 219 may obtain information from TL Report packets received by the relying device 140 (e.g., from a mobile device 101) and cause the relying device to transmit TL report packets including information received from an authenticator service 220. For example, a TL Report (Packet A) including one or more packets transmitted by a mobile device 101 via Bluetooth, may be received on a Bluetooth interface of the transport layer 210B of the relying device 140. A virtual device (e.g., virtual device 219 A configured to convey information between Bluetooth and USB) may resolve (e.g., translate) the TL Report (Packet A) to Packet A and output Packet A on the USB to provide Packet A as input to an authentication service 220 (or WS Service 125 or application 110 including an authentication service 220). Thus, for example, an authentication service 220 may receive Packet A on the USB in accordance with an authentication protocol expected by the authentication service (e.g., without altering the authentication service). In turn, the authentication service 220 may output a Packet B on the USB in accordance with the authentication protocol to the virtual device 219 A. The virtual device 219 A may obtain Packet B via the USB and output one or more packets (or data) based on Packet B for transmission via Bluetooth interface. For example, the virtual device 219 A may cause the Bluetooth interface of the transport layer 210B to transmit TL Report (Packet B), which may be received on a Bluetooth interface of the mobile device 101. The mobile device 101 may receive TL Report (Packet B) via a connection interface of transport layer 210A, e.g., Bluetooth in the above example. Thus, for example, TL Report packets, which may include, but are not limited to, USB HID device reports, may be communicated wirelessly between the mobile device 101 and the relying device 140. While an example of transport over Bluetooth is provided above, TL Report packets may be exchanged between the mobile device 101 and relying device 140 on other wireless transport mechanisms, examples of which may include, but are not limited to, TCP, UDP, NFC, etc. over WiFi Direct, NFC, etc. interfaces.

The mobile device 101 may include a translator 208 to resolve (e.g., translate) TL Report packets received by a connection interface of the transport layer 210A of the mobile device, such as TL Report (Packet B), to a Packet B (e.g., of an authentication protocol, like CTAP) for conveyance to the authenticator 202 of the authentication application 120. For example, the translator 208 may output Packet B to the authentication application 120, which may communicate Packet B information to the core authenticator 202 via the authenticator API 204 in accordance with an authentication protocol, like CTAP (e.g., the authenticator 202 may receive Packet B information consistent with Packet B information output by an authentication service 220 on a bus, like a USB, of a relying device 140). Thus, a USB HID report output by an authentication service 220, such as TL Report (Packet B), may be translated into a CTAP (or other authentication protocol) Packet B for delivery to the authenticator. In some examples, a handlePacket method of the authenticator 202 may be called (e.g., by the authentication application 120 via the authenticator API 204) to handle the incoming Packet B, which may correspond to a request (e.g., to authenticate a user). An outgoing response packet, e.g., Packet B, may be returned to the authentication application 120 via the authenticator API 204 from the authenticator 202 by a sendPacket method, like a callback, to the authenticator API 204.

In some examples, a mobile device 101 broadcasting an advertisement of an authentication service may be discoverable by multiple relying devices (or other actors). While some transport layers 210 may be limited by signal range, a device that discovers the mobile device 101 may relay information about the availability of that device to other devices (e.g., on a network). Some example embodiments of an authentication application 120 may restrict servicing of requests received by the mobile device 101 for authentications services to only trusted devices, like a trusted relying device 140. In some examples, a trusted relying device 140 may be a relying device 140 to which the user of the mobile device 101 has registered with to permit authentication requests. The authentication application 120 may store, or cause the TEE to store, device information about those registered devices and ignore requests from other non-registered devices. In some examples, the WS Service 125 may store information about mobile device 101 registered for authentication operations. In turn, the WS Service 125 may filter discoverable devices advertising authentication services based on whether their device information matches the device information of a registered device such that virtual devices are only provisioned for registered devices advertising authentication services. Moreover, consistent with the above approaches, Packet payloads exchanged between mobile devices and relying devices, such as packet payloads conveyed between a core authenticator (or TEE) and the virtual device (or authentication service) may be encrypted, such as to prevent a threat actor from obtaining packet payloads in plain text for replay or assertion.

Authentication techniques consistent with the above described environment for authentication of a user may include, but are not limited to, authentication of a user to an OS level user account of a relying device 140, authentication of a user to a user account of an application 110, authentication of a user to a user account of a webservice (or website) accessed by an application 110, authentication of a user to cause the relying device 140 to issue commands to a control mechanism coupled to the relying device, such as an actuator of a lock, valve, or other physical device for which user access is controlled, among other examples.

Authentication of a user, in some examples, may be performed by a remote server 145, 155 based on verification of authentication information generated by a mobile device 101 and received from an authentication service 220 of a relying device 140. For example, a challenge may be transmitted from a remote server 145, 155 to an authentication service 220 of a relying device 140 requesting access to a secure asset. The relying device 140 may transmit the challenge (e.g., Packet B information) to the mobile device 101 for a response. The authenticator 202 may process the challenge to generate a response, like authentication information, such as a signature based on a private key corresponding to the user of the mobile device 101. The mobile device 101 may transmit the authentication information responsive to the challenge (e.g., Packet A information) to the relying device 140 from which it received the challenge. The authentication service 220 receives the challenge response and relays the response to the remote server 145, 155 for verification. In turn, the remote server 145, 155 verifies the authentication information, such as by a signature verification algorithm which may take as input a signature of challenge response (e.g., authentication information) and a public key of a key pair corresponding to the user (e.g., which may be established during a prior registration process). The signature verification algorithm may output a result (e.g., verified or not verified) indicating whether the private key of the key pair was used to generate the signature. In some examples, the remote server 145, 155 may also verify a signature of a trusted execution environment (e.g., TEE 103) of the mobile device 101, which may be included as an authentication information component of the challenge response. The signature output by the TEE may be verified in a similar fashion, such as by a signature verification algorithm taking as input the signature and a public key corresponding to the TEE, to determine whether results were securely generated by the TEE. For example, a private key used by the authenticator 202 may be encrypted at rest (e.g., by the TEE) and use of that key may be governed subject to authentication of the user to the mobile device 101 (e.g., by biometric, pin, password, etc.). In some examples, operations involving use of the key may be performed within the TEE. For example, the authenticator 202, via the authenticator API 204, may perform a callback to the authentication application 120 which may request processing of data within the TEE and provide the results of the processing to the authenticator 202.

Example Process for Authentication of a User with a Mobile Authenticator

Figure 3:
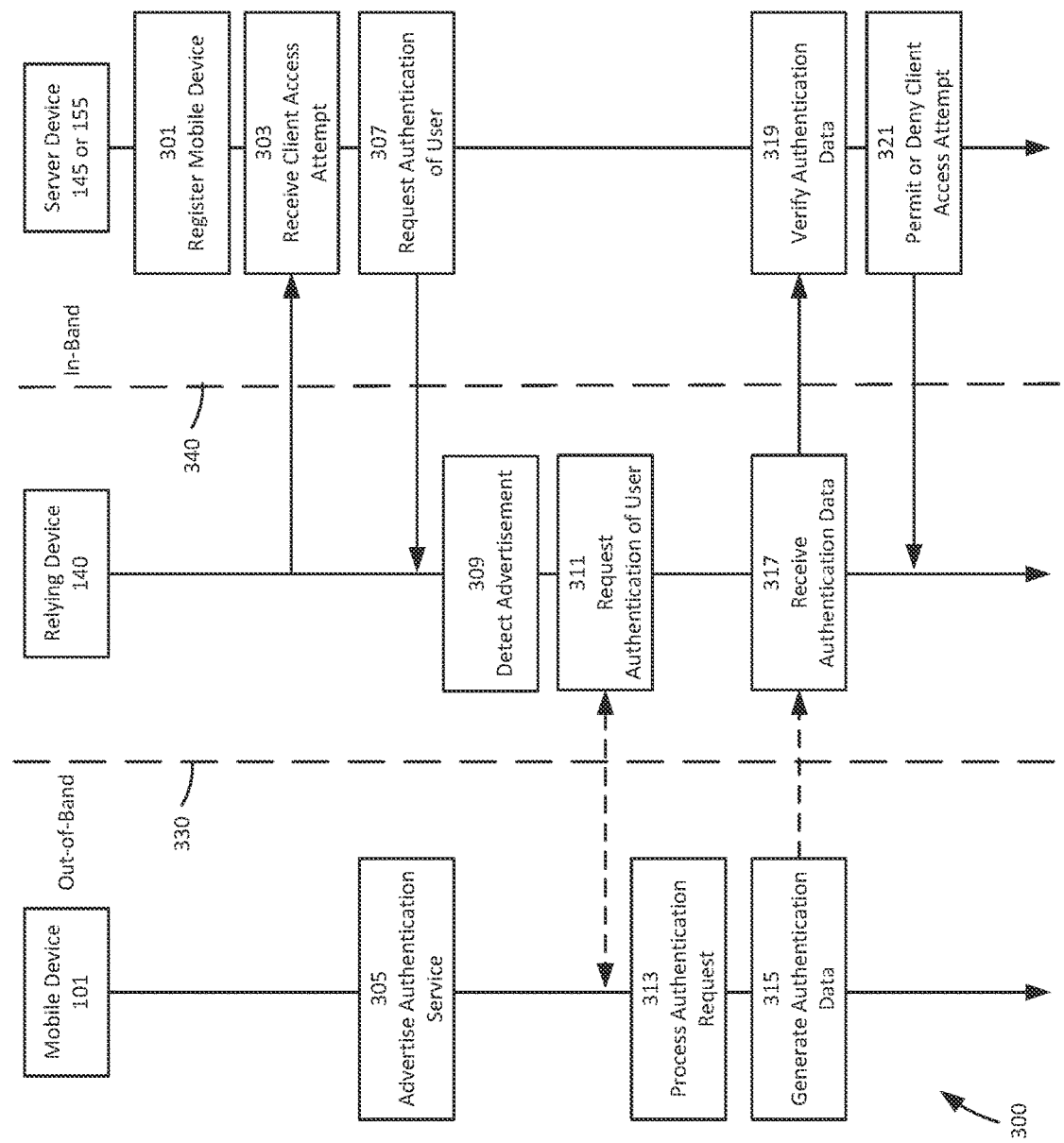
FIG. 3 is a diagram showing an example process for authentication of a user within example computing environments described in the present application.

FIG. 3 is a diagram showing an example of a process 300 for authentication of a user in accordance with example computing environments disclosed herein. The process 300 of FIG. 3 illustrates example operations performed by various devices, such as a mobile device 101, relying device 140, and a server device 145 or 155, according to at least one embodiment described herein. Embodiments may perform some of the steps in different orders than that illustrated.

As shown, the process 300 begins with registration 301 of a mobile device, like mobile device 101. The registration step 301 may include the transmission of various credentials to the server device. For example, the server device may receive a public key corresponding to the mobile device, representations of credentials, and signed data which may be verified based on the public key. As previously noted, a representation may be based on a credential (or a combination of credentials) by which a user may authenticate on their mobile device 101, like a deterministic value based on a credential that does not reveal the credential value.

In some examples, in step 301, the server device (e.g., which may include operations of one or more of a relying party server 145 or authentication server 155) may receive registration information corresponding to the mobile device 101, such as a public key, or other encryption key, by which the server device may encrypt data that can be decrypted by the mobile device 101, such as with a corresponding private key of a key-pair, or other decryption key. The encryption key and decryption key may be keys of a key-pair generated by an asymmetric encryption protocol, examples of which include a public key and a private key of key-pair in a public-key cryptography system and are referred to as such below for ease of explanation.

For example, the mobile device 101 may generate a key pair including a private key and a public key. Use of the private key by the mobile device 101, such as to sign data or decrypt data, may be governed based on authentication of the user on the mobile device. For example, the user may be required to authenticate on the mobile device 101 by providing a biometric input (e.g., fingerprint, eyeprint, faceprint, etc.) or other input (e.g., pin, password, etc.) prior to use of the private key. In some examples, representations of such credentials may be conveyed to the server device, the representations not divulging the underlying values. Thus, in some examples, the server device may request that or verify whether that user authenticated on a given credential. In some cases, a policy may be conveyed to the mobile device 101 by which establishment of credentials and use of those credentials is governed. The private key is retained by the mobile device 101 for generating authentication data.

The server device may verify data as being generated by the mobile device 101 of a user. In some cases, such operations may be based on data pushed to the mobile device 101, like a user certificate, or other token, like in a corporate environment. The server device may receive the aforementioned public key, or one or more other keys, which may be shared keys of an asymmetric key protocol, for which the mobile device 101 has access to the corresponding secret key. Asymmetric keys, like of a key pair, may include a secret/private key, like a first key, maintained in confidence by the owner, and a shared/public key, like a second key, which the owner may share with other entities for a variety of purposes. In some examples, the private key may be utilized to sign data, which may then be verified based on the public key and the data that was signed, to verify that the owner generated the signed data. Alternatively, the public key may be utilized to encrypt data which the private key is operable to decrypt. In turn, the private key owner may present a result of the decryption (or a result based on the decryption) as a proof of knowledge of the private key, like an assertion of identity. While a shared key may be relatively suitably utilized in this latter manner, each party must retain the key in confidence. Accordingly, while embodiments are discussed with reference to asymmetric protocols involving key-pairs, like those including a public key and a private key, they should not be considered limited to only such protocols.

The server device may store a record containing registration information received from the mobile device 101. The record may be associated with an identifier (e.g., of an identity) associated with the user, like an account (or multiple accounts) of the user. For example, the user may authenticate to the identity or the account with the server device and register the mobile device 101 with the server device for authenticating attempts by a relying device 140 to access the account, such as via an authentication application. In various embodiments, the user may also create a user account during the registration process, such as via an authentication application. The mobile device 101 may execute the authentication application to perform one or more of the aforementioned operations, such as establishing a key-pair on the device, conveying the public key to the server device, establishing other credentials, and conveying representation of those other credentials to the server device. Thus, the server device may establish the record to associate an identifier (e.g., corresponding to a user account, identity, application, relying device, or the like as described herein) with registration information received from the mobile device. In subsequent operations, the server device may receive an identifier from a relying device, such as example relying device 140, as an indication of which user is attempting to access a secure asset, and thus identify the record based on the identifier, or may receive an identifier in association with authentication data by which the server device may identify a record and verify the authentication data Examples of a registration step 301 may also various operations outlined in U.S. application Ser. No. 17/501,925, filed on 14 Oct. 2021 or U.S. application Ser. No. 17/234, 737, filed on 19 Apr. 2021, each of which being incorporated by reference herein in their entirety. For example, the aforementioned applications describe in detail additional operations by which a mobile device may be registered with a server.

In step 303, an access attempt, or data corresponding to an access attempt, may be received by a server device 145, 155 from a relying device 140. In some embodiments, the access attempt may include an indication that the user desires to authenticate via their mobile device 101. For example, an interface of an application on the relying device 140, login prompt on relying device 140, or an interface of a website or web application or other interface may include in association with a login interface, or otherwise for selection by the user, an option to indicate that the user desires to authenticate via their mobile device 101 (e.g., out of band from the in-band relying device 140).

The mobile device 101 may be offline, e.g., does not have access (or is not otherwise connected to) a network by which the user may authenticate to the server device 145, 155, though there is no such requirement that the mobile device 101 be offline. Embodiments disclosed herein provide a process by which the relying device 140 and mobile device 101 may engage in an exchange by which authentication data corresponding to authentication of the user on the mobile device may be conveyed to the server device 145, 155 regardless of network accessibility state of the mobile device. Specifically, the mobile device 101 and relying device 140 may communicate, e.g., directly, over a communication path that is separate from the communication path between relying device 140 and the server device 145,155.

The access attempt 303 may be to a secure asset to which access thereto by the relying device 140 is governed by the server device, such as an online resource accessible by relying devices from the server device over a network. In some examples, the access attempt may correspond to a user level account of the relying device or device controlled by the relying device. The server device may receive information from the relying device 140 in association with the access attempt, like an identifier, such as one of the above noted identifiers by which a record associated with registration information corresponding to a mobile device of a user may be obtained. Thus, for example, information received by the server device in association with the access attempt may include information such as user account information and/or device information associated with the access attempt. For example, the server device may receive a user account identifier, or identifying information about the relying device 140, or other identifying information described herein by which a record may be identified. In some cases, a combination of such identifying information may be received. In some embodiments, an identifier-password combination may be received and authenticated prior to access of the record corresponding to the identifier. In some example embodiments, an identifier of a mobile device may be received, or in combination with other identifiers, such as where the user has registered multiple such devices. In some example embodiments, an identifier of a mobile device (e.g., like a mobile telephone number) may be received in lieu of other identifiers. Embodiments may support receipt of a single unique identifier, like a username, phone number of a mobile device, email, or the like, but may utilize multiple such identifiers or identifier-password combination (where the password may be a PIN, like a 4, 6, or 8 digit PIN), to mitigate ability of a nefarious party (e.g., by DDOS type attack) to cause record lookup for inauthentic access attempts. Such attempts may be thwarted by establishment of information corresponding to known relying devices, or multiple identifier requirements, like a username in combination with a PIN that impose minimal friction (and oftentimes even less than traditional username-password schemes) on users while increasing difficulty of a nefarious party to supply a valid set of inputs by which a record may be identified (even if identification of such in does not yield unauthorized access). Some embodiments may perform record lookup responsive to receiving authentication data, which may include an identifier corresponding to the mobile device 101.

In some embodiments, receipt of a client access attempt 303 may correspond to a selection of a user interface element by the relying device 140, such as on a login interface, to authenticate via a FIDO2 or Smart Card authenticator. The mobile device 101 may include an authentication application including an authenticator implementing FIDO2 or Smart Card compliant authentication protocols by which processing of authentication data is implemented. In various embodiments, some processes may be implemented within a TEE of the mobile device 101 to afford increased security.

In a step 305, the mobile device 101 may advertise authentication services on one or more communication interfaces of the mobile device 101. For example, temporally proximate to electing to authenticate via mobile device 101 by selection of a user interface element on the relying device 140, the user may execute or bring into focus on the interface of a mobile device an authentication application on the mobile device 101. The authentication application may cause the mobile device 101 to broadcast on one or more interfaces an advertisement of an available authentication service 305. For example, the mobile device 101 may advertise, like a beacon, over Bluetooth, WiFi, or other communication interface described herein, its capability to authenticate a user.

In a step 307, a server device may request authentication of a user of the relying device 140, such as by authentication of a user on their mobile device 101. For example, in response to receipt of data from the relying device 140 indicative of a selection of a user interface element to authenticate via mobile device, the server device may request authentication of a user. In some examples, the request may include identifying information corresponding to the server device. For example, during the registration step 301, credentials corresponding to the authentication application on the mobile device 101 may be established with a server device. Similarly, in some examples, the registration step may include receipt of a public key or other data corresponding to the server device by the mobile device 101 such that the mobile device may verify the authenticity of authentication requests. For example, the mobile device 101 may verify a certificate of trust or cryptographic signature based on information obtained during registration.

In some examples, the server device may select request data for authentication of the user. For example, the server device may select device-specific request data corresponding to a mobile device (e.g., mobile device 101 of the user) by which the mobile device may generate authentication data corresponding to the access attempt. The mobile device 101 may be selected based on its registration in association with the user of the relying device 140 as indicated by one or more identifiers in association with the access attempt, such as for identification of a record having associated device information corresponding to the registered mobile device. In some examples, a UID record may be identified and an associated device record corresponding to the registered mobile device may be accessed to selected request data, like a challenge, by which the mobile device 101 may generate authentication data. The device-specific data corresponding to the mobile device 101 may be stored in association with a record of an identity of the user, like an account, or UID record, of the user that is identified based on information (e.g., like an identifier associated with the record) received by the server device from the relying device 140 in association with the access attempt. The device-specific data may include a public key corresponding to a private key maintained by the mobile device 101 (applicants note that the mobile device 101 need not maintain the private key in plaintext to maintain the private key, or in an encrypted form for which the mobile device retains a decryption key, but rather the mobile device may store an encrypted value by which the private key may be obtained (e.g., to process data) based on other data, like a biometric, PIN or password or other user suppliable credential values, which may constitute a decryption key or basis for one). The device-specific data may also include one or more representations of credentials or other data maintained on the mobile device 101.

In some examples, requesting authentication of a user 307 may be, or may include, an assertion of identity of the service device 145, 155, like a cryptographic signature of a certificate of trust, or other signed data, verifiable by the mobile device 101 (e.g., based on the public key associated with the server device). Thus, for example, the mobile device 101 may be able to distinguish authentic from inauthentic authentication requests. The mobile device 101 may utilize different credential values and different keypairs for different server devices, such as to prevent a nefarious party from requesting authentication of a user to receive authentication data generated by the mobile device 101 that could be replayed to a server device.

In a step 309, the relying device 140 may detect an advertisement of authentication services available from a mobile device 101, like a mobile device advertising availability of an authentication service on an interface within communication range of a corresponding interface of the relying device 140. For example, a service, like a WS Service, executing on the relying device 140 may detect a beacon advertisement obtained via a corresponding communication interface of the relying device 140. The beacon advertisement may indicate authentication services provided by the mobile device 101. In some examples, the beacon advertisement may indicate an authentication protocol, like a FIDO2 or Smart Card compliant protocol. The WS Service may configure a virtual device, in some cases based on the advertised authentication protocol, or based on an authentication protocol specified by the request 307. For example, the WS Server may configure a virtual USB HID device or a virtual USB CCID device. In some examples, authentication request data received from the server device, such as via one or more packets, may be received by an application or service of the relying device 140 (e.g., to which the client access attempt corresponds). The authentication request data may be conveyed to the virtual device reporting on the relying device 140 for authentication of a user. The virtual device may repackage, such as via a transport layer protocol available to the relying device 140 and advertised by the mobile device 101, the received authentication request data in one or more packets according to the transport layer protocol.

In a step 311, the relying device 140 and mobile device 101 may establish a connection by which the relying device requests authentication of the user of the mobile device. Specifically, the relying device 140 and mobile device 101 may establish a wireless connection by which the devices may communicate data corresponding to authentication of the user of the mobile device. The wireless connection may be a direct connection between the devices, like a Bluetooth or WiFi connection. Thus, for example, establishment of a connection for exchange of data between the relying device 140 and mobile device 101 may be restricted to relative proximity of their communication interfaces for directly exchanging data. Some examples may communicate over NFC or other wireless communication protocol, such as by readying respective interfaces to transmit or receive data in sequence. In either case, the relying device 140 may structure a request in accordance with the authentication protocol which may be transmitted by one or more packets over the communication interface to the mobile device 101. For example, the relying device 140 may communicate data corresponding to a request for authentication of a user received from a server device to the mobile device 101 via one or more packets.

In step 313, the mobile device 101 may process the authentication request, such as in accordance with the authentication protocol to generate authentication data 315. For example, the mobile device 101 may receive one or more packets containing authentication request data, and an authentication application may obtain the authentication request data from the packets. In some examples, the received packets, like packets on a transport layer, may be translated to obtain packets of data corresponding to the authentication protocol. The authentication application may cause the mobile device 101 to process the authentication request data, such as by requesting authentication of the user on the mobile device via one or more credentials corresponding to the user, like a biometric, PIN, password, or other credential corresponding to the user. In some examples, collection and processing of the credentials may be implemented with a TEE of the mobile device 101. Successful authentication of the user of the mobile device 101 upon one or more user credentials, such as based on a matching of supplied credentials to previously stored credential values, may cause the mobile device to permit use of secure values, such as a private key or other secure values corresponding to an authenticator of the authentication application. A private key, for example, may be used to decrypt data corresponding to a challenge included in the authentication request, such as to determine a value which may be verified by the server device. In another example, the private key may be used to sign data, like an authentication result determined by the mobile device 101 for the user upon the supplied credentials. The signed data, which may be communicated with the data that was signed (e.g., like a representation of a credential and a timestamp) may be verified by the server device. In some cases, an identifier of the mobile device 101, like a public key, or other information by which the server device may select a record by which authentication data generated by the mobile device 101 may be verified is communicated along with other authentication data.

In step 315, the mobile device 101 may generate authentication data for communication to the relying device 140. Some examples of authentication data may include, but are not limited to a signature verifiable by the server based on the data that was signed and the public key, a value obtained by using the private key, such as to decrypt data (e.g., that was encrypted by the public key) corresponding to a challenge, the value returned being verifiable by the server as matching that which was encrypted, a signature of the value, and thus verifiable by the server based on the public key and value, or other examples discussed herein. The authentication application may structure authentication data in accordance with an authentication protocol by which the user is to be authenticated (e.g., in accordance with an authentication protocol advertised by the mobile device and elected for authentication of the user). The authentication data may be communicated by one or more packets of the communication protocol by which the mobile device 101 and relying device 140 established a communication session for authentication of the user.

In step 317, the relying device 140 receives the authentication data from the mobile device 101. For example, the relying device 140 may receive the authentication data on the communication interface by which the mobile device 101 and relying device 140 established communications. The authentication data may be received by one or more packets on a transport layer. The packets may be conveyed to a specified virtual device configured by the relying device 140 (e.g., by a WS Service executing on the relying device 140). The virtual device may translate the received packets on a transport layer to obtain packets of data corresponding to the authentication protocol. In turn, the packets corresponding to the authentication protocol may be conveyed to an application or service of the relying device 140 by which the request for authentication of the user 307 was received. In turn, the relying device 140 may transmit the received authentication data to the service device for verification.

The authentication application on the mobile device 101, or a policy conveyed to authentication application or mobile device, or configuration of a TEE on the mobile device, may govern access to utilize the private key retained on the mobile device. For example, access to the private key may be governed by authentication of the user in accordance with supplying one or more of the aforementioned credentials. In other words, the user may be required to authenticate on the mobile device 101 by supplying one or more of a PIN, password, faceprint, fingerprint, or other biometric or user identifying means (e.g., that comply with security requirements of a policy) prior to being permitted to utilize the private key. Utilization of the private key may also be governed based on other factors, such as one or more rules, like an assertion of identity by the server device (e.g., to prevent the private key from being utilized for operations other than those pertaining to authentication requests). In some embodiments, those rules may be enforced by the TEE or other secure component of the mobile device 101, such as by restricting utilization of the private key in accordance with rules which may be stored or verified (e.g., cryptographically, such as by cryptographic signature or hash) by the TEE (e.g., based on data stored securely within the TEE). Accordingly, utilization of the private key, in some embodiments, may be restricted to the TEE or other secure component of the mobile device 101 such that a CEE of the mobile device cannot access the private key (e.g., in plaintext) or otherwise utilized the private key for unauthorized operations. In other words, divulgence of values of the private key may be restricted, thus affording a high degree of security. Moreover, access restrictions based on one or more rules, which may be based on proof of identity by the server device, may prevent unauthorized use of the private key.

In a step 319, the service device may verify received authentication data 319 corresponding to a client access attempt 303. For example, the service device may receive authentication data generated by the mobile device 101 from the relying device 140 via one or more packets over a network connection, such as via the internet, between the server device and the relying device 140. The mobile device 101 and relying device 140, by contrast, may communicate out of band 330, such as directly, over a communication session distinct from the in-band communications 340 between the relying device and the server device. The server device may verify the authentication data received from the relying device 140 that was generated out of band by the mobile device 101 and determine, based on the result of the verification, whether to permit or deny 321 the client access attempt.

In some examples, the server device may store UID Records corresponding to different users and/or accounts which may be associated with one or more other records of devices which the user utilizes to access secure assets or has registered for authentication processes. Based on an identifier received in association with the access attempt by the relying device 140, or an identifier received in association with authentication data, like a user account identifier, the server device may identify a UID Record, such as within a repository storing various UID Records corresponding to different users and/or accounts which may include information about the devices used by the different users or used under the different accounts to access secure assets. A UID record identified by the server device may include records or a listing of one or more devices registered with the server device for user authentication. Accordingly, the server device may select a record comprising information corresponding to a device registered by the user and associated with the UID record corresponding to the identity or the account of the user, like a record containing information about a registered mobile device 101. The registration of the device and creation of the device record may further include the receipt of credential information for the user from the device and a public key as explained above, which may be identified by the server device based on information received in association with the access attempt by the relying device or in received authentication data. In either example, the service device may identify a record corresponding to a mobile device, and in some examples, a record corresponding to a relying device (e.g., for enforcing a policy governing access of a user to the relying device or user/relying device access to a secure asset). The record corresponding to the mobile device may include identifying information corresponding to a user or user account and credentials and public keys by which authentication data may be verified. In some examples, received authentication data may include a response to a challenge which may be generated based on an identified record corresponding to a mobile device. For example, a public key of a key pair established during registration of the mobile device may be utilized to encrypt data, like a value, corresponding to a challenge and the mobile device 101 may prove knowledge of the private key by decryption of encrypted data to obtain the value in plain text, which may be signed (e.g., by a private key for which the server device has a public key, which may be a different or the same key pair by which the challenge was processed) or encrypted (e.g., by a public key corresponding to the server) and returned for verification. In either example, the relying device 140 or other device may be unable to generate the necessary authentication data as the mobile device 101 (and server device in some examples) retains access to private keys or other secure values. In other examples, the authentication data may include an assertion of identity, like a zero-knowledge proof, like proof of access to a private key of a key pair, such as to generate a signature, which may be verified by the server device using a public key of the key pair established during registration of the mobile device 101.

In a step 321, the server device permits or denies the access attempt by the client device based, at least in part, on the result of verification of the authentication data generated by the mobile device 101e. Accordingly, the access attempt by the client device from step 303 may be authenticated, at least in part, by involvement of a different device for out-of-band authentication, regardless of whether that device has network access, such as mobile device 101 that is operable to authenticate a user permitted to access the secure asset by additional factors for increased security of the asset.

Figure 4:
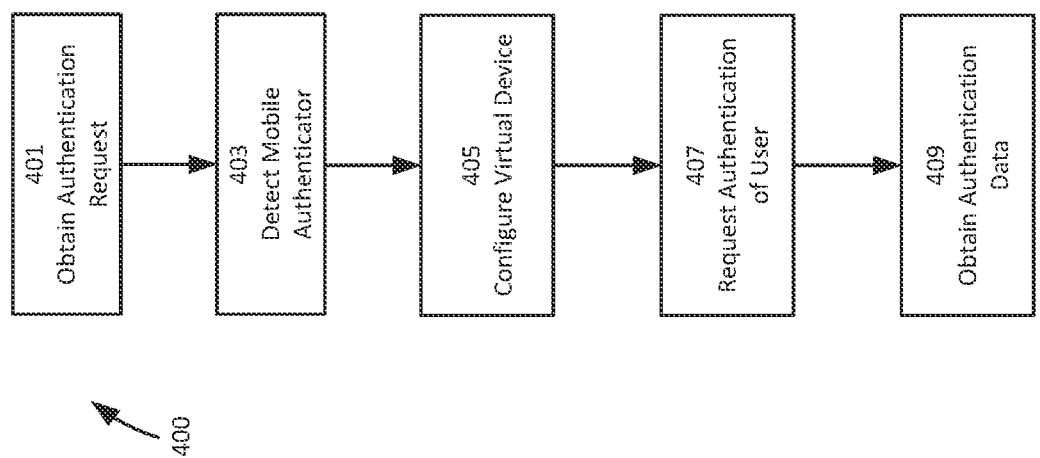
FIG. 4 is a diagram showing an example process for conveying credentials by a relying device within example computing environments described in the present application.

Example Process for Conveying Credentials by a Relying Device from a Mobile Authenticator FIG. 4 is a diagram showing an example of a process 400 for conveying credentials by a relying device in accordance with example computing environments disclosed herein. The process 400 of FIG. 4 illustrates example operations performed by a relying device 140, according to at least one embodiment described herein. Embodiments may perform some of the steps in different orders than that illustrated.

As shown, the process 400 begins with obtaining an authentication request 401, such as from a remote server. For example, an application or authentication service of the relying device may receive a request for user authentication from the remote server. For example, an authentication service may transmit (or cause an application to transmit) packets of information indicative of a request to access a secure asset to a remote server and receive packets of information, like a request for authentication of a user, over a wired or wireless internet connection with the remote server. In some examples, a request for authentication of a user may be received in response to selection of a user interface element via the relying device to authenticate via a mobile device including an authenticator. In some examples, the user interface element may indicate a corresponding authentication protocol, like a FIDO2, Smart Card, or other authentication protocol.

In a step 403, the relying device may detect a mobile authenticator within range of a communication interface of the relying device. For example, a mobile device including an authentication application indicating an authenticator may advertise one or more authentication services, and the relying device may determine whether a mobile device is advertising an authentication server on an authentication protocol selected via the user interface element. In some examples, the relying device may detect a mobile authenticator in response to receipt of an authentication request from the remote server.

Disclosed techniques need not rely on a wired physical connection between the mobile device and the relying device, like a wired connection to communicate over a USB. A WS Service executed on the relying device may detect an advertisement of an authentication service from a mobile device, such as on a wireless communication interface on which the mobile device advertises an authentication service. In some examples, the WS Service may interface with a device discovery service of an operating system of the relying device, like a NT service or LaunchDaemon or similar Daemon or service that performs device discovery on communication interfaces of the relying device to detect available devices, such as available authentication devices, like mobile devices, advertising within range of one or more of the communication interfaces. Examples of authentication services advertised by a mobile device and that may be detected by the WS Service may include advertisement of FIDO2 standard compliant or smart card standard authentication services.

In some examples, zero-configuration networking may be used to exchange information between a mobile device and the relying device. Zero-configuration networking protocols may support service discovery, address assignment, and hostname resolution. For example, a zero-configuration networking protocol, like Bonjour, may resolve an address of another device, and devices may report services (e.g., like an authentication service) that a device offers to other devices. Some examples may use DNS service records, which in some examples may be mDNS records for configuration of a connection. Thus, for example, a device may address packets to another device, and vice versa, to communicate information.

In a step 405, the WS Service may configure a virtual device on the relying device for the conveyance of an authentication request to a mobile device and receipt of authentication data from the mobile device. For example, the WS Service may configure a virtual device as a USB CCID device based on an advertisement indicative of a smart card authenticator service or a USB HID driver in response to an advertisement of a FIDO2 authenticator service and election of a respective authentication protocol for authentication of the user. In some examples, the WS Service may configure a virtual device responsive to an advertisement and receipt of an authentication request from a remote server that each indicate a compliance communication protocol. The WS Service may also select a communication protocol of a transport layer by which the mobile device and relying device are to exchange data. For example, the WS Service may select a communication interface from a set of interfaces on which a mobile device is advertising authentication services, such as based on connection strength (e.g., SNR) or bandwidth, A virtual device may be configured for a given communication interface, such as to translate packets between an authentication protocol and transport layer protocol of the interface elected for exchange of data between the mobile device and relying device. For example, when a virtual device is created, a custom input/output control scheme may be specified for the virtual device to facilitate translation between the transport layer packets and authentication protocol packets.

Thus, for example, an authentication service or application of the relying device may receive packets, like CTAP packets, on the USB output by a virtual device in accordance with an authentication protocol (e.g., FIDO2) expected by the authentication service (e.g., without altering the authentication service). In turn, the authentication service or application of the relying device may output packets, like CTAP packets, on the USB in accordance with the authentication protocol to the virtual device. The virtual device may translate received packets for transmission to the mobile device via the elected transport layer protocol on a corresponding wireless interface, examples of which may include Bluetooth, TCP, UDP, NFC, etc. over Bluetooth, WiFi Direct, NFC, etc. interfaces.

In a step 407, the relying device may transmit a request to authenticate a user to the mobile device to which the relying device established a connection on a communication interface as described above. For example, the virtual device may cause the communication interface of the relying device to transmit a packet, like a CTAP packet wrapped in the transport layer protocol, for requesting authentication of a user to the mobile device. The mobile device may include a translator to resolve packets received over the transport layer to those of the authentication protocol, like CTAP, for conveyance to an authenticator of the mobile device, like an authenticator of an authentication application. Thus, for example, the mobile device may obtain a CTAP packet requesting authentication of a user from the relying device. The authenticator of the mobile device may process the received packet, such as by a handlePacket method of the authenticator, and generate an outgoing response packet including authentication data (e.g., determined based on authentication of a user in accordance with an authentication protocol as described herein), such as a CTAP packet response containing authentication data. The outgoing CTAP packing may be wrapped by the transport layer protocol for conveyance back to the relying device.

In a step 409, the relying device 140 may obtain a packet on the communication interface from the mobile device. The packet may be addressed to a virtual device configured by the WS Service. The virtual device may receive the packet and translate the packet to obtain authentication data, like a CTAP response packet, responsive to the authentication request conveyed to the mobile device. The virtual device outputs a packet containing the authentication data in accordance with the authentication protocol to the authentication service or application for which authentication of a user is requested, and which conveys the authentication data obtained from the mobile device to the remote server for authentication.

In some embodiments, the functionality described in the Figures (e.g., 3-4) and elsewhere herein may be implemented with machine-readable instructions stored on a tangible, non-transitory, machine-readable medium, such that when the instructions are executed, the described functionality may be implemented. In some embodiments, notwithstanding use of the singular term "medium," these instructions may be stored on a plurality of different memory devices (which may include dynamic and persistent storage), and different processors may execute different subsets of the instructions, an arrangement consistent with use of the singular term "medium." In some embodiments, the described operations may be executed in a different order from that displayed, operations may be omitted, additional operations may be inserted, some operations may be executed concurrently, some operations may be executed serially, and some operations may be replicated, none of which is to suggest that any other description is limiting.

Figure 5:
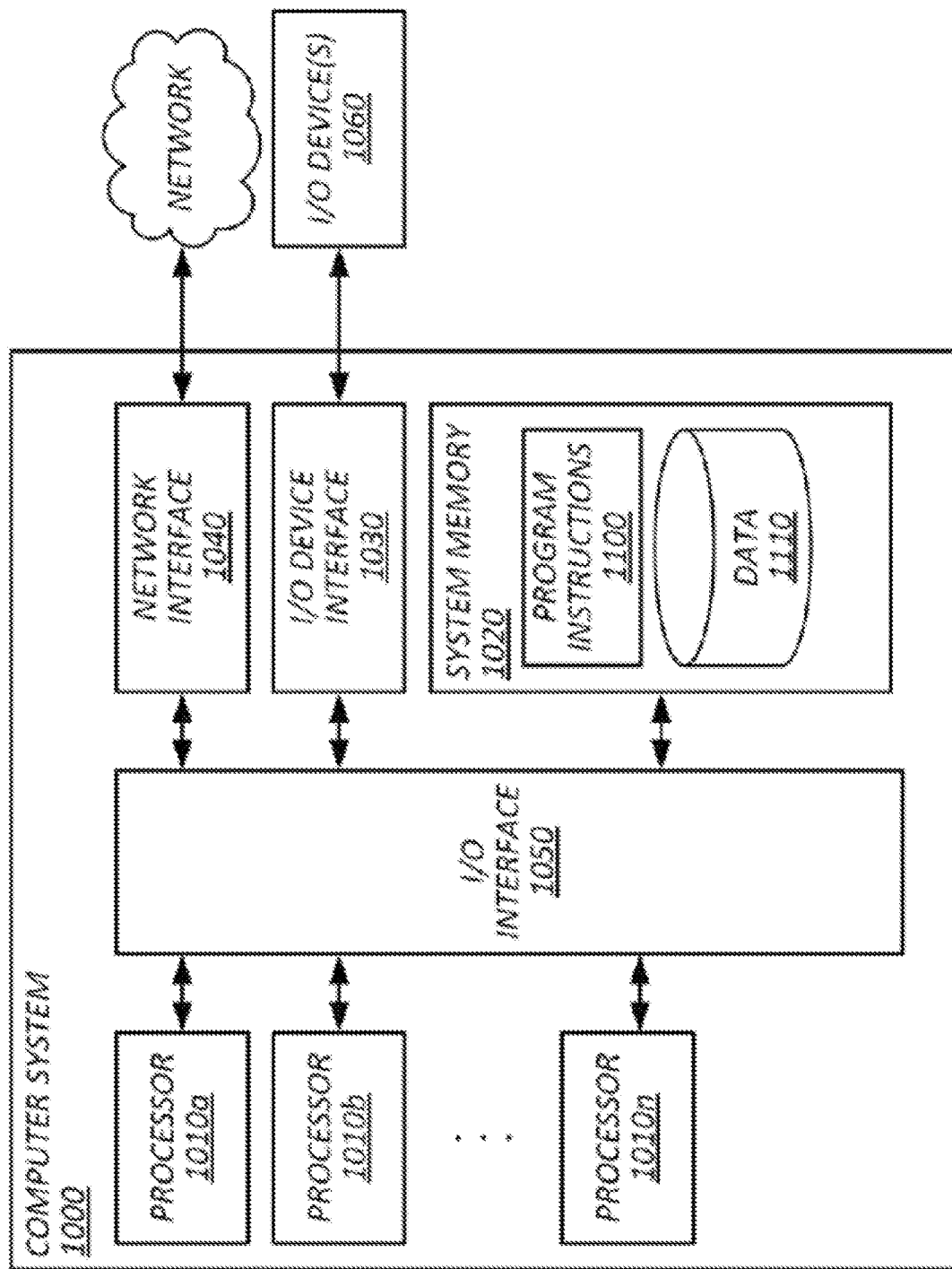
FIG. 5 is a block diagram showing an example of a computing device by which the present techniques may be implemented.

FIG. 5 is a diagram that illustrates an example computing system 1000 in accordance with embodiments of the present techniques. The various servers (e.g., 145, 155), which may include one or more computing devices, client devices (e.g., mobile devices 101, relying devices 140), or repositories (e.g., 160, 165) described herein may include one or more components like those of the example computing system 1000. Various portions of systems and methods described herein, may include or be executed on one or more computer systems similar to computing system 1000. Further, functions, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory

1020, network interface 1040, I/O devices 1060, or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be used independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Example embodiments of the present techniques may include, but are not limited to the following embodiments:

1. An embodiment of a tangible, non-transitory, machine-readable medium storing instructions that when executed by one or more processors of a computer system effectuate operations comprising: establishing, for a mobile device executing a user authentication component, a record of an identity of a user, the record indicative of the mobile device and credentials by which the user authenticates on the mobile device; receiving, from a relying device executing a client authentication component, a request to access a secure asset and a selection to authenticate via the mobile device executing the user authentication component; requesting, from the relying device, user authentication data generated by the mobile device on an authentication protocol; receiving, over a network connection from the relying device, the user authentication data in the authentication protocol, the user authentication data being translated to the authentication protocol by the relying device from a direct wireless connection to the mobile device; verifying the authentication data based on the record to determine whether the user is authenticated to access the secure asset from the relying device; and permitting, based on the verifying, the relying device to access the secure asset under the identity of the user.
2. An embodiment wherein establishing a record of an identity of a user comprises: obtaining a public key corresponding to the mobile device, one or more credentials, and signed data, the signed data being verifiable based on the public key.
3. An embodiment wherein: the mobile device generates a key pair including a private key and the public key, the mobile device generates the signed data based on the private key and one or more of the credentials, and the mobile device authenticates the user on one or more of the credentials prior to permitting use of the private key.
4. An embodiment wherein receiving, from a relying device, a request to access a secure asset and a selection to authenticate via the mobile device comprises: receiving an indication of the selection being performed within a user interface of an application executed on the relying device, receiving an indication of the selection being performed within a user interface of a website accessed by the relying device, receiving an indication of the selection being performed within a user interface of a web application accessed by the relying device, or receiving an indication of the selection being performed within a user-level account login interface of an operating system executed by the relying device.

5. An embodiment wherein a selection to authenticate via the mobile device comprises: a selection to authentication via FIDO2 or Smart Card authenticator.

6. An embodiment wherein requesting, from the relying device, user authentication data generated by the mobile device on an authentication protocol comprises: transmitting, to the relying device, identifying information corresponding to a server device and signed data by which the identity of the server device is verifiable by one or more of the relying device and the mobile device; and transmitting, to the relying device, a request on the authentication protocol for authentication of the user of the mobile device.

7. An embodiment wherein: the authentication protocol is a FIDO2 or Smart Card authenticator compliant protocol.

8. An embodiment wherein receiving, over a network connection from the relying device, the user authentication data in the authentication protocol, the user authentication data being translated to the authentication protocol by the relying device from a direct wireless connection to the mobile device comprises: receiving the user authentication data in a FIDO2 or Smart Card authenticator compliant protocol, and wherein: the mobile device generates the user authentication data, and the relying device translates one or more packets conveying the user authentication data from a protocol of the direct wireless connection to the authentication protocol for conveyance over the network connection.

9. An embodiment wherein verifying the authentication data based on the record to determine whether the user is authenticated to access the secure asset from the relying device comprises: accessing the record based on an identifier received in association with the access attempt by the relying device; obtaining a cryptographic key associated with the record; and verifying the authentication data using the cryptographic key.

10. An embodiment wherein permitting, based on the verifying, the relying device to access the secure asset under the identity of the user comprises: granting access to a website accessed by the relying device under an account of the user, granting access to a web application accessed by the relying device under an account of the user, or granting access to a user-level account of an operating system executed by the relying device, the user-level account corresponding to the user.

11. An embodiment of a tangible, non-transitory, machine-readable medium storing instructions that when executed by one or more processors of a computer system effectuate operations comprising: requesting, by a computing device, access to a secure asset from a remote server; receiving, by the computing device from the remote server, a request to authenticate a user on an authentication protocol; detecting, by the computing device, a mobile device advertising an authentication service within range of a wireless communication interface of the computing device; configuring, by the computing device, a virtual device on a universal serial bus of the computing device to translate packets received on the wireless communication interface to packets output on universal serial bus in the authentication protocol and packets received on the universal serial bus in the authentication protocol to packets output on the wireless communication interface; outputting, by the computing device, one or more packets on the wireless communication interface comprising data corresponding to the request to authenticate the user on the authentication protocol; receiving, by the computing device from the mobile device, one or more packets on the wireless communication interface comprising data corresponding to a response to the request to authenticate the user on the authentication protocol; translating, by the computing device using the virtual device, the one or more received packets to one or more packets output on the universal serial bus in the authentication protocol to obtain authentication data responsive to the request to authenticate the user; and transmitting, by the computing device to the remote server, the authentication data.

12. An embodiment wherein requesting, by a computing device, access to a secure asset from a remote server comprises generating a request responsive to: receiving an indication of a selection to authenticate the user being performed within a user interface of an application executed on the computing device, receiving an indication of a selection to authenticate the user being performed within a user interface of a website accessed by the computing device, receiving an indication of a selection to authenticate the user being performed within a user interface of a web application accessed by the computing device, or receiving an indication of a selection to authenticate the user being performed within a user-level account login interface of an operating system executed by the computing device.

13. An embodiment wherein receiving, by the computing device from the remote server, a request to authenticate a user on an authentication protocol comprises: receiving identifying information corresponding to the remote server and signed data by which the identity of the remote server is verifiable by one or more of the computing device and the mobile device.

14. An embodiment wherein: the authentication protocol is a FIDO2 or Smart Card authenticator compliant protocol.

15. An embodiment wherein detecting, by the computing device, a mobile device advertising an authentication service within range of a wireless communication interface of the computing device comprises: detecting a signal advertising a FIDO2 or Smart Card authenticator on the wireless communication interface with a device discovery service or a zero-configuration networking protocol.

16. An embodiment wherein configuring, by the computing device, a virtual device on a universal serial bus of the computing device comprises: configuring a virtual chip card interface device or a virtual human interface device, wherein: the virtual chip card interface device is configured responsive to detecting the mobile device advertising a Smart Card authenticator service, and the virtual human interface device is configured responsive to detecting the mobile device advertising a FIDO2 authenticator service.

17. An embodiment wherein translating packets received on the wireless communication interface to packets output on universal serial bus in the authentication protocol comprises: resolving one or more received packets in accordance with a protocol of the wireless communication interface to data conveyed by the received packets; and generating one or more output packets on the universal serial bus in the authentication protocol based on the data.
18. An embodiment wherein: the one or more received packets comprise CTAP packet data wrapped in accordance with the protocol of the communication interface.
19. An embodiment wherein translating packets received on the universal serial bus in the authentication protocol to packets output on the wireless communication interface comprises: resolving one or more received packets on the universal serial bus in the authentication protocol to data conveyed by the received packets; and wrapping the data based on a protocol of the wireless communication interface to generate one or more output packets on the wireless communication interface to convey the data to the mobile device.
20. An embodiment wherein: the one or more output packets comprise CTAP packet data wrapped in accordance with the protocol of the communication interface.
21. An embodiment wherein: the mobile device is configured to translate the one or more output packets to CTAP packets, and the mobile device executes an authenticator responsive to the CTAP packets.
22. An embodiment of a system comprising a processor and a non-transitory medium storing computer program instructions, the processor executing the computer program instructions to effectuate the operations of any one of embodiments 1-21.
23. An embodiment of a method comprising: the operations of any one of embodiments 1-21.

What is claimed is:

1. A tangible, non-transitory, machine-readable medium storing instructions that when executed by one or more processors of a computer system effectuate operations comprising:
   requesting, by a computing device, access to a secure asset from a remote server system;
   receiving, by the computing device from the remote server system, a request to authenticate a user on an authentication protocol, wherein receiving the request includes receiving identifying information corresponding to the remote server system and signed data by which the identity of the remote server system is verifiable by the computing device and the mobile device;
   detecting, by the computing device, the mobile device advertising an authentication service within range of a wireless communication interface of the computing device;
   configuring, by the computing device, a virtual device on a universal serial bus of the computing device to translate packets received on the wireless communication interface, from the mobile device, to packets output on universal serial bus in the authentication protocol and packets received on the universal serial bus in the authentication protocol to packets output on the wireless communication interface, to the mobile device;
   outputting, by the computing device, one or more packets on the wireless communication interface comprising data corresponding to the request to authenticate the user on the authentication protocol;
   receiving, by the computing device from the mobile device, one or more packets on the wireless communication interface comprising data corresponding to a response to the request to authenticate the user on the authentication protocol;
   translating, by the computing device using the virtual device, the one or more received packets to one or more packets output on the universal serial bus in the authentication protocol to obtain authentication data responsive to the request to authenticate the user;
   transmitting, by the computing device to the remote server system, the authentication data, wherein:
      the remote server system verifies the authentication data to obtain a verification result, and
      the computing device is permitted access to the secure asset based at least in part on the verification result; and
   detecting, by the computing device, that the mobile device is no longer advertising the authentication service and, in response to the detection, causing the virtual device to stop reporting as available on the universal serial bus of the computing device.

2. The medium of claim 1, wherein requesting, by a computing device,
   access to a secure asset from a remote server system comprises generating a request responsive to:
   receiving an indication of a selection to authenticate the user being performed within a user interface of an application executed on the computing device,
   receiving an indication of a selection to authenticate the user being performed within a user interface of a website accessed by the computing device,
   receiving an indication of a selection to authenticate the user being performed within a user interface of a web application accessed by the computing device, or
   receiving an indication of a selection to authenticate the user being performed within a user-level account login interface of an operating system executed by the computing device.

3. The medium of claim 1, wherein:
   the authentication protocol is a FIDO2 or Smart Card authenticator compliant protocol.

4. The medium of claim 1, wherein detecting, by the computing device, a mobile device advertising an authentication service within range of a wireless communication interface of the computing device comprises:
   detecting a signal advertising a FIDO2 or Smart Card authenticator on the wireless communication interface with a device discovery service or a zero-configuration networking protocol.

5. The medium of claim 1, wherein configuring, by the computing device, a virtual device on a universal serial bus of the computing device comprises:
   configuring a virtual chip card interface device or a virtual human interface device, wherein:
      the virtual chip card interface device is configured responsive to detecting the mobile device advertising a Smart Card authenticator service, and
      the virtual human interface device is configured responsive to detecting the mobile device advertising a FIDO2 authenticator service.

6. The medium of claim 1, wherein translating packets received on the wireless communication interface to packets output on universal serial bus in the authentication protocol comprises:
   resolving one or more received packets in accordance with a protocol of the wireless communication interface to data conveyed by the received packets; and generating one or more output packets on the universal serial bus in the authentication protocol based on the data.

7. The medium of claim 6, wherein:
the one or more received packets comprise CTAP packet data wrapped in accordance with the protocol of the communication interface.

8. The medium of claim 1, wherein translating packets received on the universal serial bus in the authentication protocol to packets output on the wireless communication interface comprises:
resolving one or more received packets on the universal serial bus in the authentication protocol to data conveyed by the received packets; and
wrapping the data based on a protocol of the wireless communication interface to generate one or more output packets on the wireless communication interface to convey the data to the mobile device.

9. The medium of claim 8, wherein:
the one or more output packets comprise CTAP packet data wrapped in accordance with the protocol of the communication interface.

10. The medium of claim 9, wherein:
the mobile device is configured to translate the one or more output packets to CTAP packets, and
the mobile device executes an authenticator responsive to the CTAP packets.

11. The medium of claim 1, wherein configuring, by the computing device, a virtual device on a universal serial bus of the computing device to translate packets received on the wireless communication interface to packets output on universal serial bus in the authentication protocol and packets received on the universal serial bus in the authentication protocol to packets output on the wireless communication interface comprises one or more of:
configuring the virtual device based on the wireless communication interface on which the mobile device is advertising the authentication service; and
configuring the virtual device based on the authentication service advertised by the mobile device.

12. The medium of claim 1, the operations further comprising:
steps for user authentication.

13. The medium of claim 1, the operations further comprising:
steps for conveying credentials.

14. The medium of claim 1, wherein:
the remote server system permits the computing device to access the secure asset.

15. The medium of claim 1, wherein:
the remote server system transmits the verification result or indication of the verification result to a relying party server hosting or servicing the secure asset, and
the relying party server permits the computing device to access the secure asset based at least in part of the verification result.

16. The medium of claim 15, wherein:
the remote server system comprises the relying party server, and
the remote server system comprises an authentication server, the authentication server verifying the authentication data to obtain the authentication result and transmitting the verification result or indication of the verification result to the relying party server.

17. A computer-implemented method, the method comprising:
requesting, by a computing device, access to a secure asset from a remote server system;
receiving, by the computing device from the remote server system, a request to authenticate a user on an authentication protocol, wherein receiving the request includes receiving identifying information corresponding to the remote server system and signed data by which the identity of the remote server system is verifiable by the computing device and the mobile device;
detecting, by the computing device, a mobile device advertising an authentication service within range of a wireless communication interface of the computing device;
configuring, by the computing device, a virtual device on a universal serial bus of the computing device to translate packets received on the wireless communication interface, from the mobile device, to packets output on universal serial bus in the authentication protocol and packets received on the universal serial bus in the authentication protocol to packets output on the wireless communication interface, to the mobile device;
outputting, by the computing device, one or more packets on the wireless communication interface comprising data corresponding to the request to authenticate the user on the authentication protocol;
receiving, by the computing device from the mobile device, one or more packets on the wireless communication interface comprising data corresponding to a response to the request to authenticate the user on the authentication protocol;
translating, by the computing device using the virtual device, the one or more received packets to one or more packets output on the universal serial bus in the authentication protocol to obtain authentication data responsive to the request to authenticate the user;
transmitting, by the computing device to the remote server system, the authentication data, wherein:
the remote server system verifies the authentication data to obtain a verification result, and
the computing device is permitted access to the secure asset based at least in part on the verification result; and
detecting, by the computing device, that the mobile device is no longer advertising the authentication service and, in response to the detection, causing the virtual device to stop reporting as available on the universal serial bus of the computing device.

18. The method of claim 17, wherein requesting, by a computing device, access to a secure asset from a remote server system comprises generating a request responsive to:
receiving an indication of a selection to authenticate the user being performed within a user interface of an application executed on the computing device,
receiving an indication of a selection to authenticate the user being performed within a user interface of a website accessed by the computing device,
receiving an indication of a selection to authenticate the user being performed within a user interface of a web application accessed by the computing device, or
receiving an indication of a selection to authenticate the user being performed within a user-level account login interface of an operating system executed by the computing device.

19. The method of claim 17, wherein:
the authentication protocol is a FIDO2 or Smart Card authenticator compliant protocol.

20. The method of claim 17, wherein detecting, by the computing device, a mobile device advertising an authentication service within range of a wireless communication interface of the computing device comprises:
detecting a signal advertising a FIDO2 or Smart Card authenticator on the wireless communication interface with a device discovery service or a zero-configuration networking protocol.

21. The method of claim 17, wherein configuring, by the computing device, a virtual device on a universal serial bus of the computing device comprises:
configuring a virtual chip card interface device or a virtual human interface device, wherein:
the virtual chip card interface device is configured responsive to detecting the mobile device advertising a Smart Card authenticator service, and
the virtual human interface device is configured responsive to detecting the mobile device advertising a FIDO2 authenticator service.

22. The method of claim 17, wherein translating packets received on the wireless communication interface to packets output on universal serial bus in the authentication protocol comprises:
resolving one or more received packets in accordance with a protocol of the wireless communication interface to data conveyed by the received packets; and
generating one or more output packets on the universal serial bus in the authentication protocol based on the data.

23. The method of claim 22, wherein:
the one or more received packets comprise CTAP packet data wrapped in accordance with the protocol of the communication interface.

24. The method of claim 17, wherein translating packets received on the universal serial bus in the authentication protocol to packets output on the wireless communication interface comprises:
resolving one or more received packets on the universal serial bus in the authentication protocol to data conveyed by the received packets; and
wrapping the data based on a protocol of the wireless communication interface to generate one or more output packets on the wireless communication interface to convey the data to the mobile device.

25. The method of claim 24, wherein:
the one or more output packets comprise CTAP packet data wrapped in accordance with the protocol of the communication interface,
the mobile device is configured to translate the one or more output packets to CTAP packets, and
the mobile device executes an authenticator responsive to the CTAP packets.

* * * * *